United States Patent [19]

Nishino

[11] Patent Number: 4,848,040

[45] Date of Patent: Jul. 18, 1989

[54] APPARATUS FOR GRINDING SHAVING CUTTER TEETH, AND METHOD OF SAME

[75] Inventor: Takayuki Nishino, Hiroshima, Japan

[73] Assignee: Mazda Motor Corporation, Hiroshima, Japan

[21] Appl. No.: 171,882

[22] Filed: Mar. 21, 1988

[30] Foreign Application Priority Data

| Mar. 23, 1987 | [JP] | Japan | 62-68500 |
| Apr. 7, 1987 | [JP] | Japan | 62-85093 |
| Apr. 7, 1987 | [JP] | Japan | 62-85094 |
| Apr. 7, 1987 | [JP] | Japan | 62-85095 |
| Apr. 7, 1987 | [JP] | Japan | 62-85096 |

[51] Int. Cl.$^4$ .................................. B24B 53/085
[52] U.S. Cl. .......................... 51/287; 51/52 R; 51/105 GG; 51/165.71
[58] Field of Search .................. 51/287, 52 R, 52 HB, 51/95 GH, 105 HB, 105 GG, 165 R, 165.71, 165.76, 165.91

[56] References Cited

U.S. PATENT DOCUMENTS 3,417,510 12/1968 Wildhaber .......................... 51/287
3,763,598 10/1973 Hofler .............................. 51/287

FOREIGN PATENT DOCUMENTS 61-131819 6/1986 Japan.

Primary Examiner—Frederick R. Schmidt
Assistant Examiner—Maurina Rachuba
Attorney, Agent, or Firm—Burns, Doane, Swecker & Mathis

[57] ABSTRACT

A tooth grinding apparatus uses a cutter grinder to regrind the tooth surfaces of a shaving cutter adapted to cut gear workpieces, the regrinding being performed whenever the tooth surfaces of the shaving cutter become worn. A plurality of tooth grinding data stored in memory in advance are preset in such a manner that the gear workpiece can be cut in dependence upon the state of the shaving cutter tooth surfaces so that the teeth of the gear workpiece will have a target tooth surface shape. The tooth surface state of the shaving cutter is measured, and tooth grinding data, which are closest to the measured tooth surface state, are called from the plurality of stored tooth grinding data. A grinding control unit controls the cutter grinder in such a manner that the tooth surfaces of the shaving cutter are ground based on the called tooth grinding data.

9 Claims, 18 Drawing Sheets

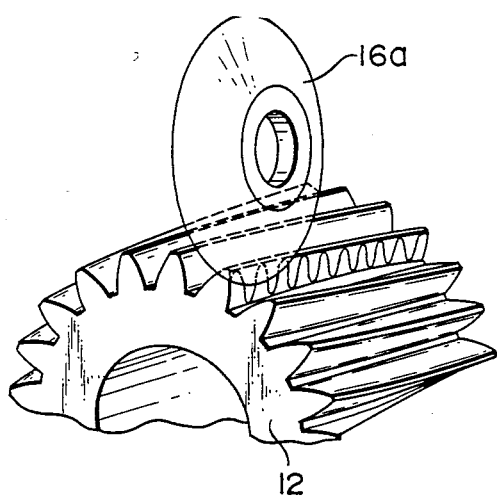
FIG. 3
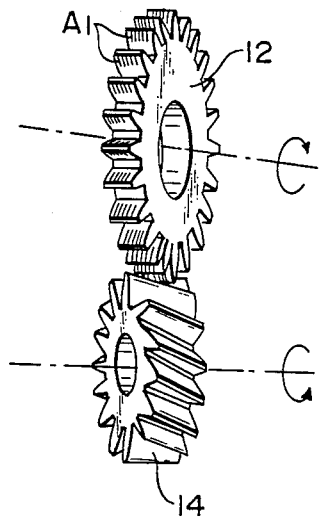
FIG. 4
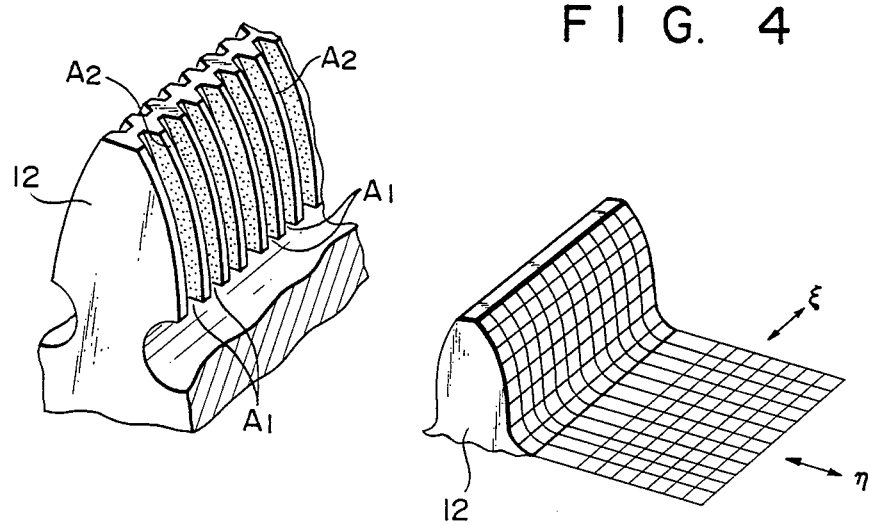
FIG. 5
FIG. 6

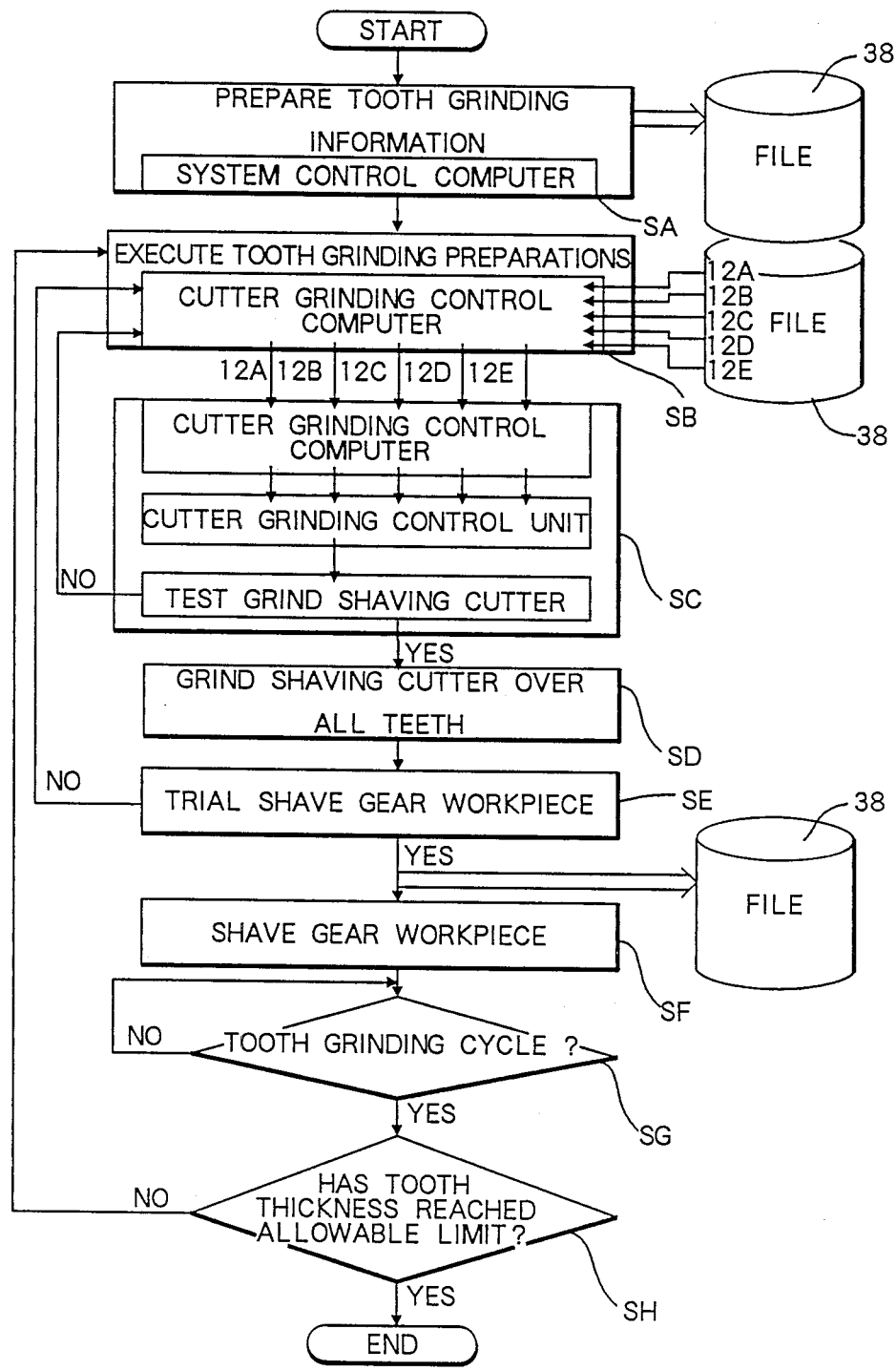
F I G. 7

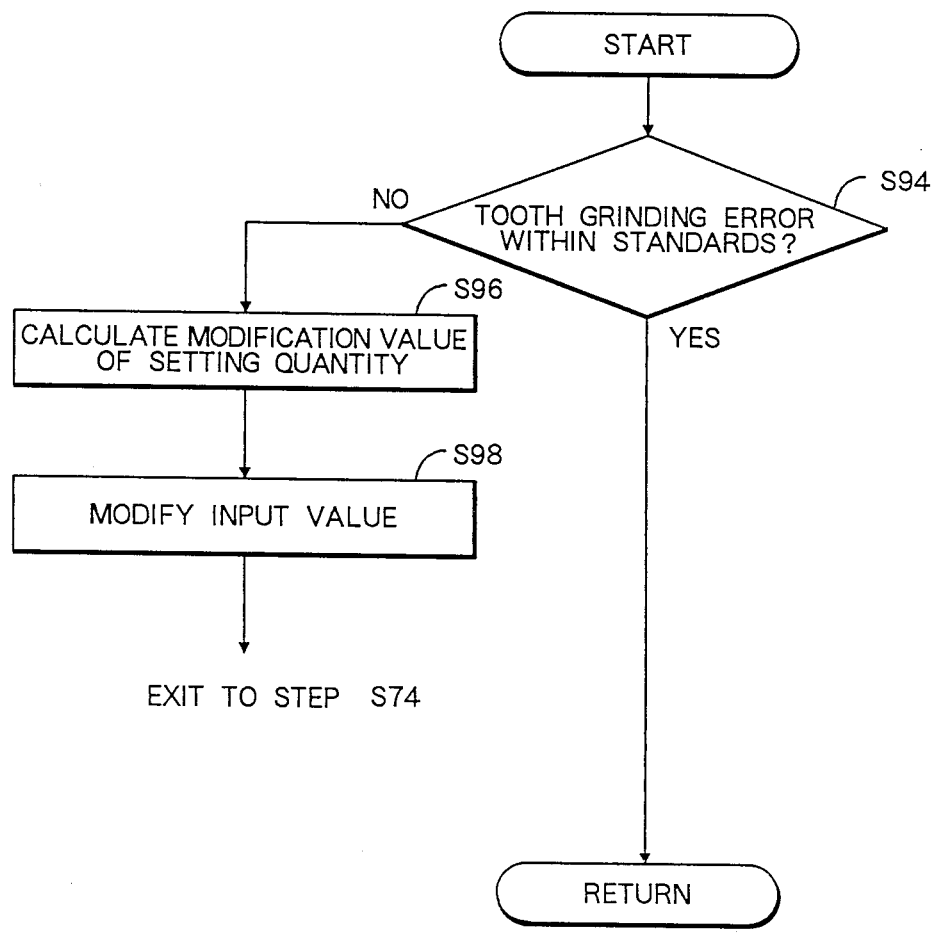
F I G. 14

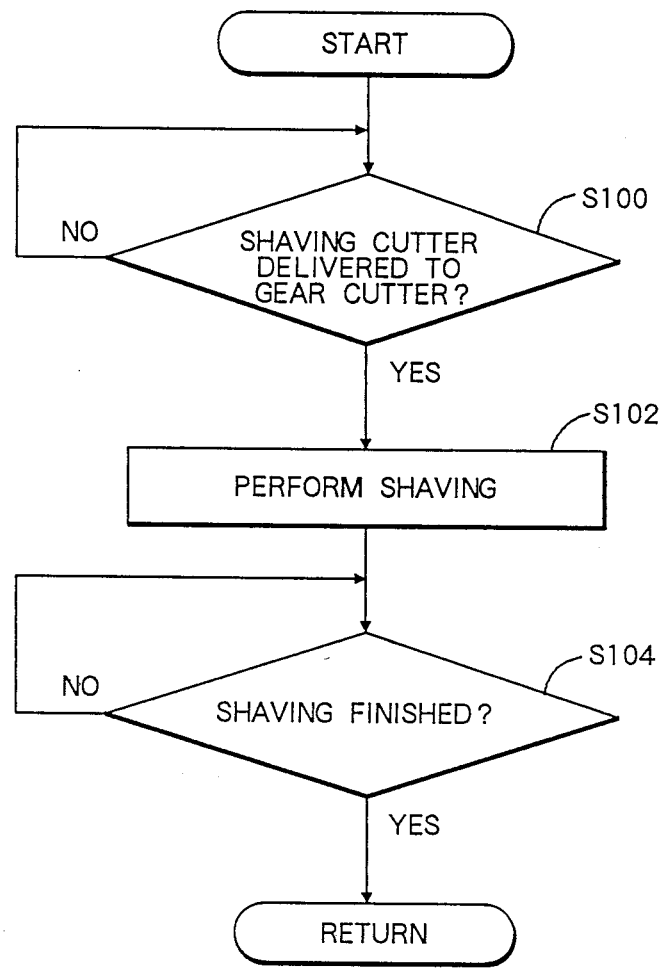
F I G. 15

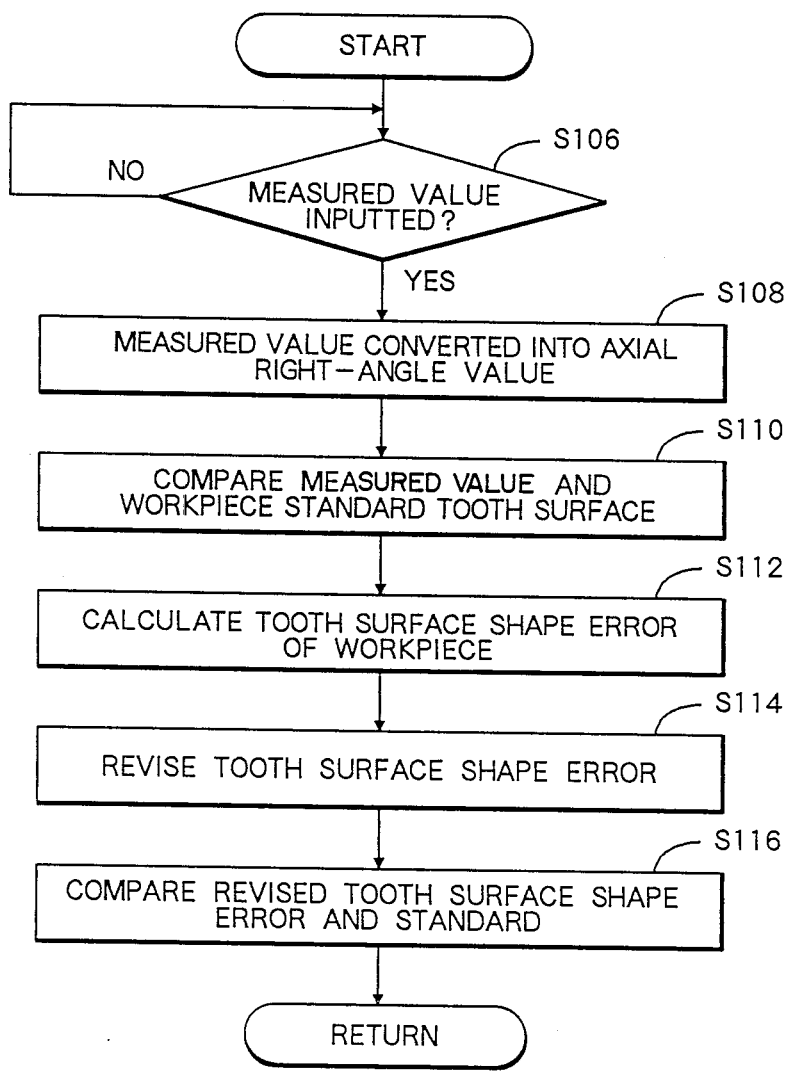
F I G. 16

APPARATUS FOR GRINDING SHAVING CUTTER TEETH, AND METHOD OF SAME

BACKGROUND OF THE INVENTION

This invention relates to an apparatus and method for grinding the teeth of a shaving cutter used to shave the surface of teeth of a gear workpiece such as a gear used in the transmission of an automotive vehicle. More particularly, the invention relates to the aforesaid apparatus and method in which the teeth of a shaving cutter worn due to repeated cutting of gear workpieces are reground to make it possible to cut gear workpieces again in excellent fashion.

When shaving the surfaces of teeth of a gear workpiece such as the gears of an automotive transmission, a shaving cutter is used, as disclosed in the specification of Japanese Patent Application Laid-Open (KOKAI) No. 61-131819, by way of example. In the arrangement disclosed, a sliding base on which a gear workpiece is placed is provided so as to be movable back and forth with respect to the position at which the shaving cutter is disposed. As the sliding base is moved back and forth, the gear workpiece is meshed with the shaving cutte to shave the surfaces of the gear workpiece teeth.

In order to prevent a decline in the tooth surface cutting precision due to thermal deformation of the shaving cutter and a change in ambient temperature, thewell-known art mentioned above teaches to measure the tooth surface shape of the gear workpiece after shaving and obtain a deviation between the actually measured value and a proper value. The amount of movement of the sliding base is successively revised in accordance with the deviation value thus obtained, thereby maintaining a high cutting precision.

A the shaving cutter repeatedly shaves gear workpieces in the manner described above, the surfaces of the cutter teeth sustain wear. When this occurs, the tooth surfaces are subjected to regrinding so that the cutter can be used a number of times (e.g. scores of times). Thus, the effective service life of the shaving cutter is extended so that the cutter can be used over a long period of time before being discarded. This serves to improve production efficiency.

A problem encountered in the foregoing is that when the shaving cutter is reground a large number of times, the thickness of the teeth gradually diminishes with each regrinding. As a result, when a gear workpiece is cut by a shaving cutter which has been repeatedly reground, there is a change in the meshing state between the gear workpiece and the shaving cutter, such as a change in the meshing pressure angle. Consequently, in order to obtain the proper shape of the gear workpiece tooth surfaces, it is necessary that the shaving cutter tooth profile be sharpened by gradually changing the tooth shape little by little in dependence upon the reduced tooth thickness.

Thus, gear workpieces can be cut in substantially proper fashion when the shaving cutter is in good condition, namely when it is free of wear. However, when the shaving cutter sustains wear, a regrinding operation that relies upon a worker becomes necessary and demands that the worker have a high level of experience and skill. Thus, in the prior art, the regrinding of a shaving cutter is a difficult operation requiring an extended period of time and the precision with which the shaving cutter is ground (namely the precision with which gear workpieces can be cut) cannot be maintained at the desired value.

SUMMARY OF THE INVENTION

An object of the present invention is to provide an apparatus and method for grinding the teeth of a shaving cutter in which, even when a shaving cutter is used upon being reground a number of times, regrinding is performed automatically in a suitable manner whenever the shaving cutter sustains wear, thereby dispensing with the need for worker experience and a high level of skill so that regrinding can be performed easily and in a short period of time and, moreover, the precision with which the teeth of the shaving cutter are ground can be well maintained to assure that the tooth profile of gear workpieces can be formed properly at all times.

Another object of the present invention is to provide an apparatus and method for grinding the teeth of a shaving cutter in which, when plural items of target tooth grinding data are stored in advance, memory capacity needed for storing these data can be reduced even though the data are stored for each of a plurality of set points on a tooth surface.

According to one aspect of the present invention, there is provided a shaving cutter tooth grinding apparatus for regrinding, by a cutter grinder, a tooth surface of a shaving cutter which cuts gear workpieces, the regrinding being performed whenever the tooth surface of the shaving cutter sustains wear, the apparatus comprising: tooth grinding data memory means for storing a plurality of tooth grinding data preset in such a manner that a gear workpiece can be cut to a target tooth surface shape, in dependence upon tooth surface state, within a usable range of the shaving cutter; tooth surface state measuring means for measuring the tooth surface state (tooth thickness, etc.) of the shaving cutter; tooth grinding data calling means for selectively calling tooth grinding data, which are close to the tooth surface state measured by the tooth surface state measuring means, from the plurality of tooth grinding data stored in the tooth grinding data memory means; and grinding control means for controlling the cutter grinder in such a manner that the tooth surface of the shaving cutter is ground based on the tooth grinding data called by the tooth grinding data calling means.

According to another aspect of the present invention, there is provided a shaving cutter tooth grinding method for repeatedly grinding a plurality of times, by a cutter grinder, a tooth surface of a shaving cutter which cuts gear workpieces, the grinding being performed whenever the tooth surface of the shaving cutter sustains wear, the method comprising: a first step of setting a plurality of tooth surface states in dependence upon a tooth grinding cycle within a usable range of the shaving cutter; a second step of setting a plurality of tooth grinding data in such a manner that a gear workpiece can be cut to a target tooth surface shape according to each tooth surface state set in the first step; a third step of storing the plurality of tooth grinding data set in the second step in memory means; a fourth step of measuring a tooth surface state of the shaving cutter; a fifth step of selecting a tooth surface state (tooth thickness, etc.), which is close to the tooth surface state measured in the third step, from the plurality of tooth surface states set in the first step; a sixth step of calling tooth grinding data, which conform to the tooth surface information selected in the third step, from the plurality of tooth grinding data stored in the memory means; and a seventh step of controlling the cutter grinder in such a manner that the tooth surface of the shaving cutter is ground based on the tooth grinding data called in the sixth step.

According to still another aspect of the present invention, there is provided a shaving cutter tooth grinding method for repeatedly regrinding a plurality of times, by a cutter grinder, a tooth surface of a shaving cutter which cuts gear workpieces, the grinding being performed whenever the tooth surface of the shaving cutter sustains wear, the method comprising: a first step of storing a plurality of tooth grinding data preset in such a manner that a gear workpiece can be cut to a target tooth surface shape, according to each of a plurality of tooth surface shape states, within a usable range of the shaving cutter; a second step of measuring a tooth surface state (tooth thickness, etc.)of the shaving cutter; a third step of selecting a tooth surface state, which is close to the tooth surface state measured in the third step, from the plurality of tooth surface states set in the first step; a fourth step of calling tooth grinding data, which conform to the tooth surface information selected in the third step, from the plurality of tooth grinding data stored in the memory means; and a fifth step of controlling the cutter grinder in such a manner that the tooth surface of the shaving cutter is ground based on the tooth grinding data called in the fourth step.

Thus, in accordance with the invention as described above, a plurality of shaving cutter tooth grinding data for properly forming the tooth surface shape of a gear workpiece are preset and stored for each type of tooth surface state (tooth thickness, etc.). Therefore, when the tooth surface of the shaving cutter is reground, the tooth surface state (thickness, etc.) prevailing at such time is measured by the tooth surface state measuring means, and tooth grinding data closest to the tooth surface state (tooth thickness, etc.) are called by the tooth grinding data calling means. When this is done, the shaving cutter tooth surface is reground by the cutter grinder under the control of the grinding control means based on the tooth grinding data, whereby the tooth surface shape of the shaving cutter is readily ground in a short period of time in accordance with the tooth grinding data. As a result, when a gear workpiece is cut by the shaving cutter which has thus been reground, the tooth surface shape of the gear workpiece is formed substantially into the target tooth surface shape irrespective of the prevailing shaving cutter tooth thickness or the like. Accordingly, the precision with which the gear workpiece is cut can be maintained as desired.

Moreover, since each item of tooth grinding data in the memory means is stored upon being defined on the tooth surface of the gear workpiece, the relevant coordinate system remains fixed irrespective of the tooth surface state (tooth thickness, etc.) which prevails at regrinding, thus enabling the capacity of the memor storing the tooth grinding data to be reduced correspondingly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a perspective view schematically illustrating the manner in which a tooth of a shaving cutter is ground by a grindstone;

FIG. 4 is a perspective view schematically illustrating the state of meshing engagement between a shaving cutter and a gear workpiece when the gear workpiece is being cut by the shaving cutter;

FIG. 5 is a schematic view showing, in enlarged form the arrangement of cutting grooves and lands on one tooth of a shaving cutter;

FIG. 6 is a perspective view for describing grid points defined on a tooth surface;

FIG. 7 is a flowchart illustrating, in simplified form, a combination of a cutting sequence of a shaving cutter and tooth grinding sequence of a gear workpiece;

FIG. 14 is a flowchart illustrating a decision procedure for a test grinding check;

FIG. 15 is a flowchart illustrating a trial shaving procedue;

FIG. 16 is a flowchart illustrating a trial shaving check procedure;

DESCRIPTION OF THE PREFERRED EMBODIMENT

The construction of a shaving cutter tooth grinding apparatus embodying the present invention will now be described with reference to the accompanying drawings.

Figure 1:
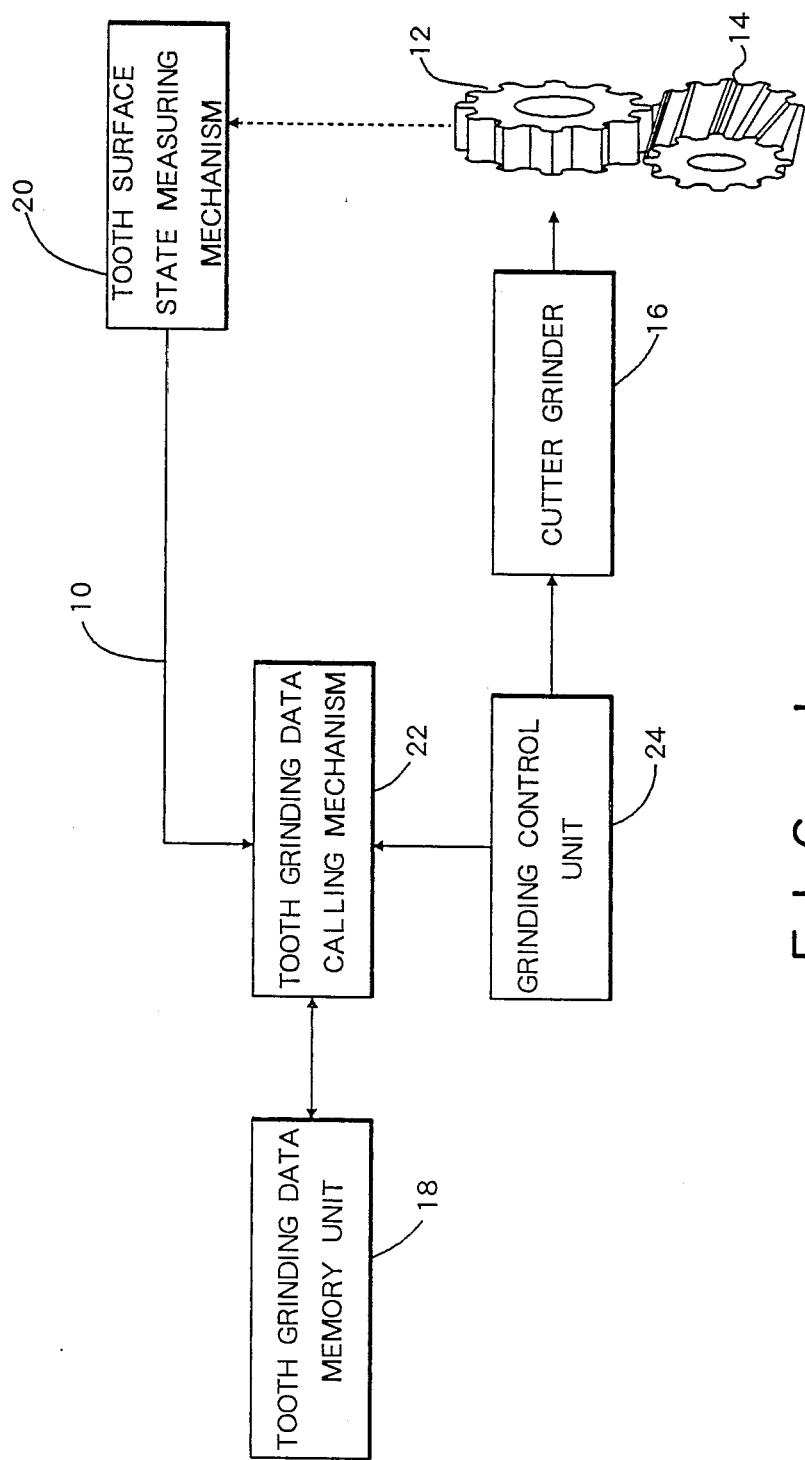
FIG. 1 is a block diagram illustrating the simplified construction of a shaving cutter tooth grinding apparatus of one embodiment according to the present invention.

As shown in FIG. 1, an apparatus 10 for grinding the teeth of a shaving cutter of one embodiment according to the present invention is adapted for two purposes, one of which is to initially shape the tooth surfaces of a shaving cutter 12, and the other of which is to regrind the worn tooth surfaces of the shaving cutter 12 so that the shaving cutter 12 can be reused. More specifically, when the shaving cutter 12 is used to shave a gear workpiece 14 which will find use as a gear in an automotive transmission or the like, the tooth surfaces of the shaving cutter 12 gradually sustain wear due to such grinding work. The tooth grinding apparatus 10 includes a cutter grinder 16 for grinding the tooth surfaces of the shaving cutter 12 and for regrinding these tooth surfaces whenever they experience a prescribed amount of wear.

The tooth grinding apparatus 10 further includes a tooth grinding data memory unit 18 for storing a plurality of tooth grinding data preset in such a manner that the tooth surfaces of the gear workpiece 14 can be cut to a target tooth surface shape according to each measured tooth surface state (tooth thickness, etc.) within a usable range of the shaving cutter 12, a tooth surface state measuring mechanism 20 for measuring the tooth surface state of the shaving cutter 2, a tooth grinding data calling mechanism 22 for calling, from the memory unit 18, tooth grinding data indicative of a tooth surface state closest to the tooth surface state measured by the tooth surface state measuring mechanism 20, and a grinding control unit 24 for controlling the cutter grinder 16 in such a manner that the tooth surfaces of the shaving cutter are ground based on the tooth grinding data called by the tooth grinding data calling mechanism 22. The tooth grinding data in the memory unit 18 are stored therein upon being defined on a tooth surace of the gear workpiece 14.

Figure 2:
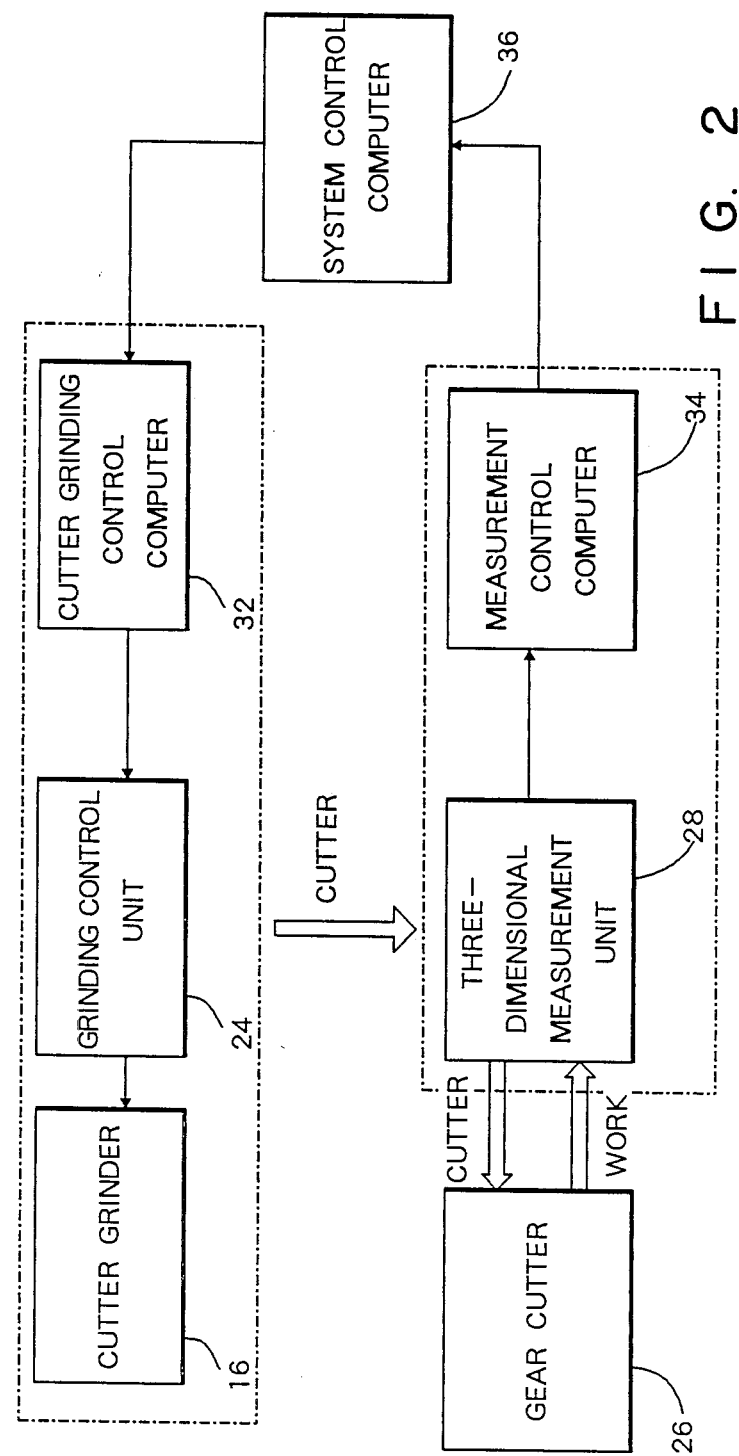
FIG. 2 is a block diagram illustrating a simplification of the overall system of the shaving cutter.

FIG. 2 shows the overall system of the apparatus 10 for grinding the teeth of the shaving cutter 12.

The cutter grinder 16 in the tooth grinding apparatus 10 has a dish-shaped grindstone 16a of a comparatively small diameter, as shown schematically in FIG. 3. When the tooth surfaces of the shaving cutter 12 used to cut the gear workpiece 14 sustain wear, the cutter grinder 16 employs the grindstone 16a to perform grinding along the entire surface of each tooth so that the tooth surfaces are finished in their entirety. This tooth surface correcting operation is carried out by adjusting the axial position of the grindstone 16a by an amount conforming to a correction variable, described below, at each of a number of points on the pass of the grindstone 16a.

A gear cutter 26 is provided for (exerimentally) shaving the tooth surfaces of the gear workpiece 14 using the shaving cutter 12 ground by the cutter gringer 16. As shown schematically in FIG. 4, the gear cutter 26 holds the shaving cutter 12 in meshing engagement with the gear workpiece 14 while rotating the cutter 12 with a prescribed angle of intersection being maintained between the axes of the cutter 12 and workpiece 14. It should be noted that the angle of intersection between the two axes is that obtained when the cutter 12 and gear workpiece 14 are skewed or twisted on their axes rather than being disposed in the same plane. The gear workpiece 14 has its tooth surfaces shaved by means of a number of cutting grooves (cerrations) $A_1 \ldots$ formed on each tooth surface of the shaving cutter 12, as depicted in FIG. 5.

As for the details of the cutting operation, the shaving cutter 12 and gear workpiece 14 rotate in unison in the meshed state described above. As a result of their skewed attitudes, the shaving cutter 12 and gear workpiece 14 slide on each other along their respect axes of rotation. By pressing the opposing faces of the cutter 12 and workpiece 14 against each other to reduce the distance between their respective centers while the sliding motion continues, the tooth surfaces of the gear workpiece 14 are cut slightly by the cerrations $A_1$, whereby these surfaces are shaved to a finish. The cerrations $A_1$ formed on each tooth of the shaving cutter 12 are designed in such a manner that their positions in the direction of tooth width differ from one tooth to the next. Also, the portion between two mutually adjacent cerrations Al defines a land $A_2$.

A three-dimensional measurement unit 28 is provided for measuring, in three dimensions, the tooth surface state of the shaving cutter 12, which is ground by the cutter grinder 16, or of the gear workpiece 14 experimentally cut by the gear cutter 26. The aforementioned tooth surface state measuring mechanism 20 for measuring the tooth surface of the shaving cutter 12 is constructed by the three-dimensional measurement unit 28.

The grinding control unit 24 is connected to the cutter grinder 16 in order to control the grinding operation of the shaving cutter 12, as described above. A cutter grinding control computer 32 for sending control information (target value data relating to the tooth surface shape of the shaving cutter 12) is connected to the grinding control unit 24. The three-dimensional measurement unit 28 is connected to a measurement control computer 34 for processing information from the measurement unit 28 relating to the measured tooth surfaces.

A system control computer 36, which is a characterizing feature of this embodiment, is connected to both the cutter grinding control computer 32 and measurement control computer 34. The system control computer 36 is adapted to accept measurement data from the measurement control computer 34 relating to the tooth surface shape of the shaving cutter 12 after it has been experimentally ground and the tooth surface shape of the gear workpiece 14, and to provide the cutter grinding control computer 32 with a target value signal relating to the tooth surface shape of the shaving cutter 12 so that the shaving cutter 12 will be reground by the cutter grinder 16 in accordance with the measurement data.

A tooth grinding sequence through which the tooth surfaces of the shaving cutter 12 are ground will now be described with reference to FIGS. 7 through 20.

First, with reference to the flowchart of FIG. 7, a cutting sequence through which the gear workpiece 14 is cut by the shaving cutter 12 will be described in brief in addition to the tooth grinding sequence performed by the shaving cutter 12.

As shown in FIG. 7, the tooth grinding sequence of the shaving cutter 12 includes a first step SA in which all information necessary for grinding the teeth of the shaving cutter 12, namely the information required in each tooth grinding cycle, is prepared. The prepared information necessary for the tooth grinding operation is stored in a file section 38 of the tooth grinding data memory unit 18.

Next, a step SB calls for tooth grinding work preparation. This entails setting information necessary in a test grinding operation, which is executed next.

The foregoing is followed by a step SC, at which only one tooth of the shaving cutter 12 is subjected to test grinding by the cutter grinder 16 based on the grinding information set at step SB. Thereafter, the tooth surface shape of the tooth surface of the shaving cutter 12 test ground as set forth above is measured by the three-dimensional measurement unit 28. This test grinding operation is executed repeatedly until the measured tooth surface shape falls within the allowable limits of a target shape.

When the tooth surface shape of the single test ground tooth of shaving cutter 12 falls within the allowable limits of a target shape, grinding is applied to all of the teeth of shaving cutter 12 at a step SD using the results of the test grinding operation.

When the grinding operation has been executed for all teeth of the shaving cutter 12, the program proceeds to a step SE, at which all of the teeth of the gear workpiece 14 are subjected to trial shaving by the gear cutter 26 using the shaving cutter 12 whose grinding has been completed. This trial shaving operation is repeated by returning to the step SB until the measured value falls within the allowable limits of the target shape. In this way regrinding is repeated to correct the tooth surface shape of the shaving cutter 12. The target value data which prevail when the tooth surface shape of the gear workpiece 14 falls within the allowable limits of the target shape are stored in the file 38 to update the same.

After the measured value in the trial shaving operation falls within the allowable limits of the target shape, the program proceeds to a step SF, at which another gear workpiece 14 is subjected to shaving by the shaving cutter 12 based on the updated target value data.

Next, at a step SG, it is decided automatically whether the time for the tooth grinding cycle has arrived, which decision is based on whether a predetermined number, e.g. 350, of the gear workpieces 14 have been cut in the shaving operation. If the cycle has arrived, the program proceeds to a step SH, at which it is determined whether the tooth thickness of the shaving cutter 12 due for the grinding cycle has reached an allowable limit. If the tooth thickness has not reached this limit, then the tooth grinding operation from step SB to step SE is executed.

The shaving cutter 12 is allowed to cut gear workpieces 14 by repeating the gear grinding cycle a plurality of times until the tooth thickness of the cutter 12 exceeds the allowable limit, i.e. until tooth thickness is too small. In other words, at the moment the tooth thickness of the shaving cutter 12 is found to exceed the allowable limit at the step SH, the tooth will be too shallow in its grroves or cerrations $A_1$ ... to secure the required cutting operation. Therefore, use of the shaving cutter 12 is halted and the cutter 12 is discarded. Thus, one shaving cutter 12 will have reached the end of its service life.

A procedure for grinding the teeth of the shaving cutter 12 executed by the system control computer 36, which is a characterizing feature of this embodiment, will now be described wth reference to FIGS. 8 through 20.

The main points of the tooth grinding procedure will be described with reference to the flowchart of FIG. 8.

Figure 9:
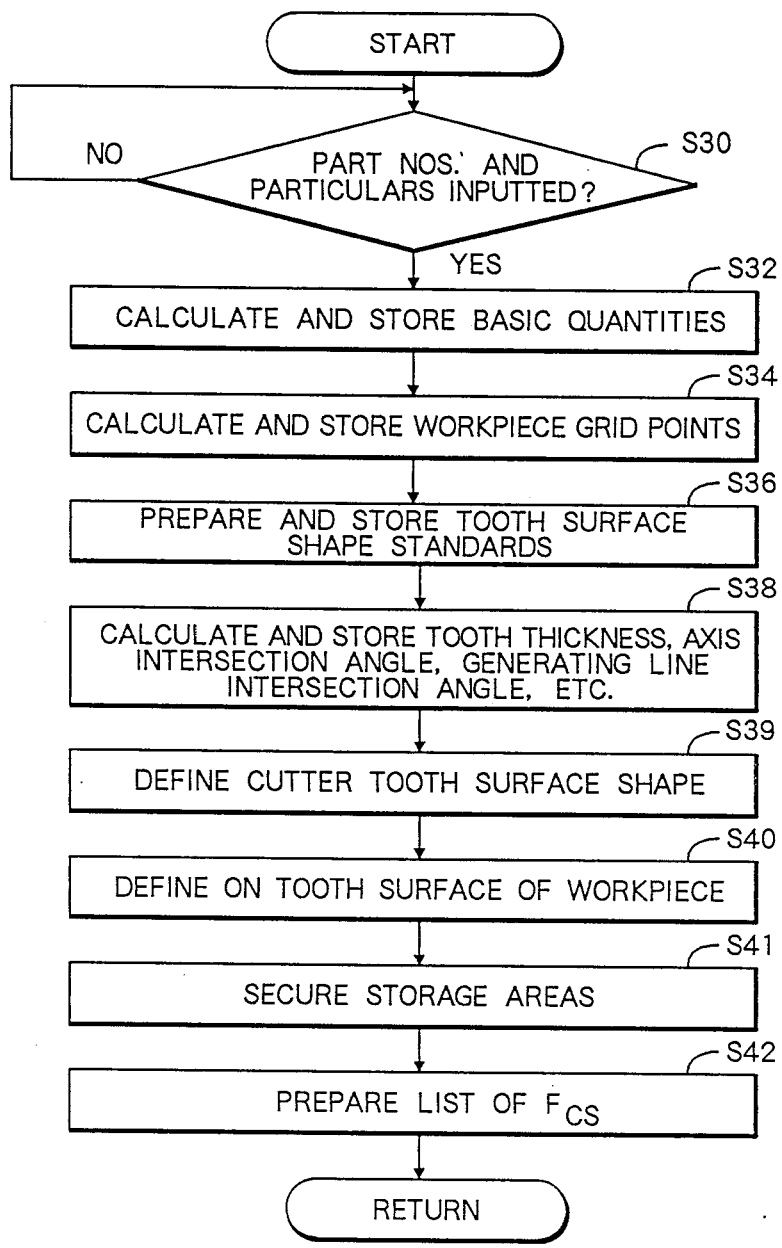
FIG. 9 is a flowchart illustrating a procedure for creating tool grinding information.

The first step of the procedure is a step S10, at which information necessary for the tooth grinding of the shaving cutter 12 is prepared based on a tooth grinding information creating sequence shown in detail in FIG. 9. For example, the information includes various particulars concerning the gear workpiece 14 to be cut, the type of shaving cutter 12 to be ground as well as information (target value data) relating to the tooth shape of the cutter 12 predicted theoretically in correspondence with each tooth grinding cycle. The tooth shape information is created for each of a plurality of tooth thicknesses (tooth thickness serving as one example expressing tooth surface state) set in correspondence with respective ones of a plurality of tooth grinding cycles. The prepared information necessary for the tooth grinding operation is stored in the file 38 of the tooth grinding data memory unit 18.

Next, preparation for the tooth grinding operation is executed at a step S12. In the tooth grinding preparatory operation, and by way of example, actually measured tooth thickness of the shaving cutter 12 to be ground (a virgin cutter 12 before it is applied to the shaving operation) is inputted. Based on the measured tooth thickness (the value whereof is a continuous quantity), a tooth thickness closest to the measured thickness is selected from the plurality of tooth thicknesses prescribed in advance at step S10, and target value data indicative of a tooth surface conforming to the selected tooth thickness (approximate value) are read out of the file 38. This operation is executed based on a tooth grinding preparation procedure shown in FIG. 9.

Step S12 is followed by a step S14, at which test grinding is performed. Here grinding information containing the target value data is transferred to the cutter grinding control computer 32, where the information to be inputted to the grinding control unit is analyzed. Thus, information (the target value data, etc.) required for the test grinding of the shaving cutter is transferred to the grinding control unit 24. Only one tooth of the shaving cutter 12 is test ground by the cutter grinder 16 based on a test grinding procedure illustrated in FIG. 10.

Next, the program proceeds to a step S16, at which the tooth surface of the one test-ground tooth of shaving cutter 12 is measured by the three-dimensional measurement unit 18. It is then determined at a step S18 whether the tooth surface shape falls within the allowable limits of the target shape. If a NO answer is received at the step S18, the program returns to the tooth grinding preparatory operation of step S12. Thus, the test grinding opeation is repeatedly performed until the measured tooth surface shape falls within the allowable limits of the target shape. During the test grinding procedure, items of grinding information relating to shaving cutters (12B - 12E) to be ground next are successively transferred to the grinding control unit 24 through the cutter grinding control computer 32.

If a YES answer is received at the step S18, namely if the tooth surface shape of tbe test ground tooth of shaving cutter 12 is determined to be within the allowable limits of the target shape, then grinding applied to all teeth of the shaving cutter 12 is executed at a step S20 using the test grinding results.

Figure 11:
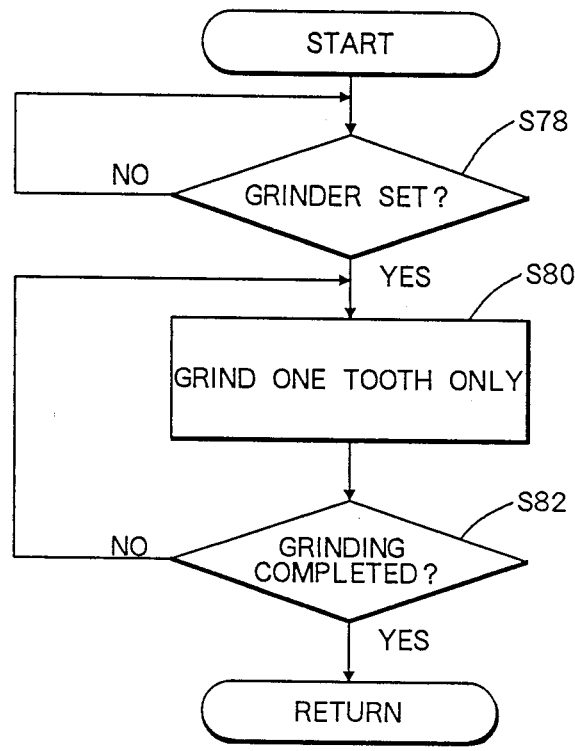
FIG. 11 is a flowchart illustrating a test grinding procedure.

When the grinding has been executed for all teeth of the shaving cutter 12, the program proceeds to a step S22, at which all teeth of the gear workpiece 14 are subjected to trial shaving by the gear cutter 26, using the shaving cutter 12 for which the grinding work has been completed, based on a trial shaving procedure the details of which are shown in FIG. 11.

At the end of the trial shaving operation, the trial shaved tooth surface of the gear workpiece 14 is measured by the three-dimensional measurement unit 28 at a step S24, and it is determined at a step S26 whether the tooth surface of the shaved gear workpiece 14 falls within allowable limits of the target shape. If a NO answer is received at the step S26, the program returns to the tooth grinding preparatory operation of step S12. This trial shaving operation is repeated by returning to the step S12 until the measured value of the gear workpiece 14 falls within the allowable limits of the target shape. In this way regrinding is repeated to correct the tooth surface shape of the shaving cutter 12. At this time the target value of the tooth surface of shaving cutter 12 is corrected in dependence upon the deviation between the actually measured value of the gear workpiece 14 and the target value.

If a YES answer is received at the step S26, the program proceeds to a step S28, at which the target value data which prevail when the tooth surface shape of the gear workpiece 14 falls within the allowable limits of the target shape are stored in the file 38 to update the same.

Thus, one cycle of the tooth grinding procedure serving as the main routine is completed.

Reference will now be had to FIG. 9 to describe the details of the tooth grinding information preparation procedure in the tooth grinding procedure of step S10 mentioned above.

With reference first to FIG. 9, the tooth grinding information preparation procedure includes a first step S30, at which it is determined whether the tool number of the shaving cutter 12, the tool number of the gear workpiece 14 and various particulars regarding the cutter 12 and workpiece 14 have been entered. If the answer is YES, various basic quantities are calculated and stored in the file 38 of the grinding data memory unit 18. Next, as shown in FIG. 6, prescribed grid points $\mu_{LW}(I)$, $\eta_{LW}(J)$, $\xi_{RW}(I)$, $\eta_{RW}(J)$ on left and right tooth surfaces of the gear workpiece 14 are prepared and stored in the file 38 at a step S34.

The symbol $\xi$ represents a variable indicating the number of a grid point on a detected tooth surface from the left side of the drawing along the direction in which the rotational axis of gear workpiece 14 extends. The symbol $\eta$ represents a variable indicating the number of a grid point on a detected tooth surface from the bottom of the tooth along a direction perpendicular to the $\xi$ direction. The subscript LW indicates the left tooth surface of the work gear, and the subscript RW indicates the right tooth surface of the same. Accordingly, $\xi_{LW}(I)$, $\eta_{LW}(J)$ indicate a grid point, on the left tooth surface, which is the I-th grid point from the left in the $\xi$ direction and the J-th grid point from the tooth bottom in the $\eta$ direction.

As shown in FIG. 6, these grid points are expressed in the form of a planar development of the detecting tooth surface, which is defined by a curved surface. In the present embodiment, seven values are set for I and seven values of J, so that a total of 49 grid points are set. It should be noted that a maximum of 15 values can be set for I and J, so that the number of grid points can be enlarged to 225.

The step S34 is followed by a step S36, at which the standards (the target tooth surface shape) $C_{RTW}(I,J)$, $C_{LTW}(I,J)$ of the workpiece 14 are prepared and stored in the file 38.

Next, the program proceeds to a step S38, at which a plurality of thicknesses $E_m(IT)$, ($IT=1, 2, \ldots$) predicted for each tooth grinding cycle are set. Here the total amount of reduction in thickness over the entire life cycle of the shaving cutter 12 is divided by a partitioning allowance, described later. The value resulting from the division is prescribed as the number of tooth grinding cycles and a field for this number is formed in the file 38. The abovementioned partitioning allowance is stipulated by the average grinding allowance for every single regrinding operation. Also, an angle of intersection $\Sigma(IT)$ between the axes of the gear workpiece 14 and shaving cutter 12, an angle of intersection $\phi(IT)$ between generating lines, actual lengths $W_c(I)$, $W_T(IT)$ of lines of action, the outer diameter $d_{KC}(IT)$ of the shaving cutter 12, an inversion coefficient $X_{NC}(IT)$ and the like are calculated and stored in the file 38.

Next, at a step S39, the left and right tooth surface shapes of the shaving cutter 12 are defined as the differences from a theoretical tooth surface (an involute helicoid surface) for every tooth thickness $E_m(IT)$. These tooth surface shapes are defined on the tooth surface of the gear workpiece 14 at a step S40 and storage areas $C_{RSC}(I,J)$, $C_{LSD}(I,J)$ thereof are secured at a step S41.

The reason for defining the tooth surface shape of the shaving cutter 12 on the tooth surface of the gear workpiece 14 is to reduce the memory capacity required. In other words, if the tooth surface shape were to be defined on the active surface of the shaving cutter 12 in rectangular coordinates $(X_c, Y_c)$, the rectangular coordinates $(X_c, Y_c)$ would be functions of tooth thickness and it would be required to set a large number of coordinates in dependence upon tooth thickness. By contrast, points on the tooth surface of the gear workpiece 14 are independent of the tooth thickness of the shaving cutter 12. Thus, defining the tooth surface shape of the shaving cutter 12 on the tooth surface of the gear workpiece 14 makes it possible to reduce the required memory capacity by an amount commensurate with the freedom from dependence on tooth thickness.

Furthermore, tooth surface shape $Z_c$ is expressed by $$Z_c = f(\xi_c, \eta_c)$$

with regard to rectangular coordinates $(X_c, Y_c)$ on the active surface of the shaving cutter 12.

In a case where tooth thickness $E_m$ is constant, points on the tooth surface of the shaving cutter 12 contact the corresponding points $(X_{107}, Y_{107})$ on the tooth surface of the gear workpiece 14. Therefore, $X_c$, $Y_c$ are expressed by the following:

$$X_c = (\xi_W, \eta_W, E_m)$$

$$Y_c = (\xi_W, \eta_W, E_m)$$

Finally, the tooth surface shape $Z_c$ may be expressed as follows, based on the foregoing relation:

$$Z_c = g(\xi_W, \eta_W, E_m)$$

In accordance with this equation, the tooth surface shape of the shaving cutter 12 is defined on the tooth surface of the gear workpiece 14 for every tooth thickness $E_m$.

After the tooth surface shape of the cutter 12 is thus defined, the program proceeds to a step S42. This step calls for preparation of a list of developed state flags $F_{cs}(IT)$ indicating whether or not target tooth surface shape data (grinding data) relating to the shaving cutter 12 for every tooth thickness $E_m(IT)$ have already been stored in the abovementioned storage areas $C_{RSC}(I,J)$, $C_{LSC}(I,J)$. (When the data have been stored in these storage areas, this state is referred to as the developed state.) At the beginning, each of the developed state flags $F_{cs}(IT)$ is initially set to "0".

Thus ends one cycle of the tooth grinding information preparation control sequence, which is a subroutine.

Figure 10A:
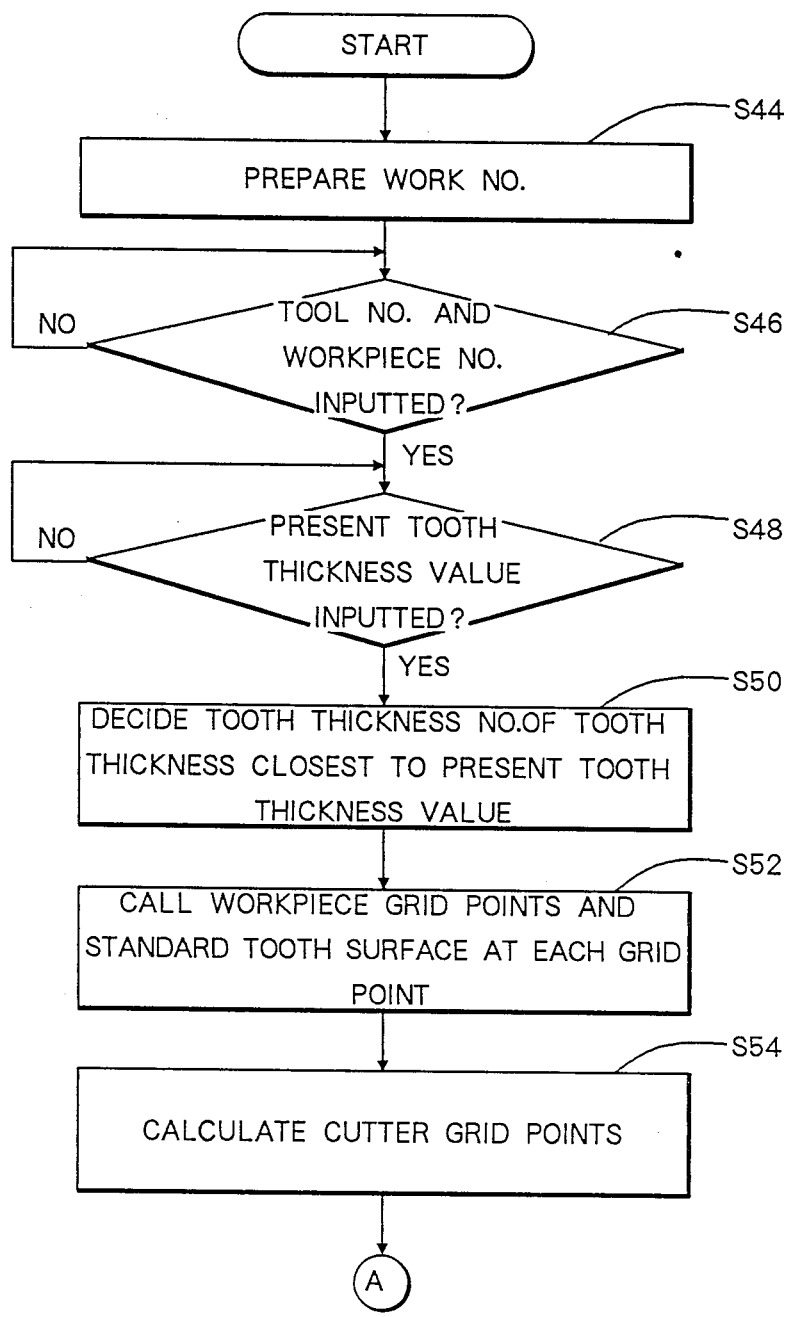
FIGS. 10A and 10B are flowcharts illustrating a procedure for tooth grinding preparation work.
Figure 10B:
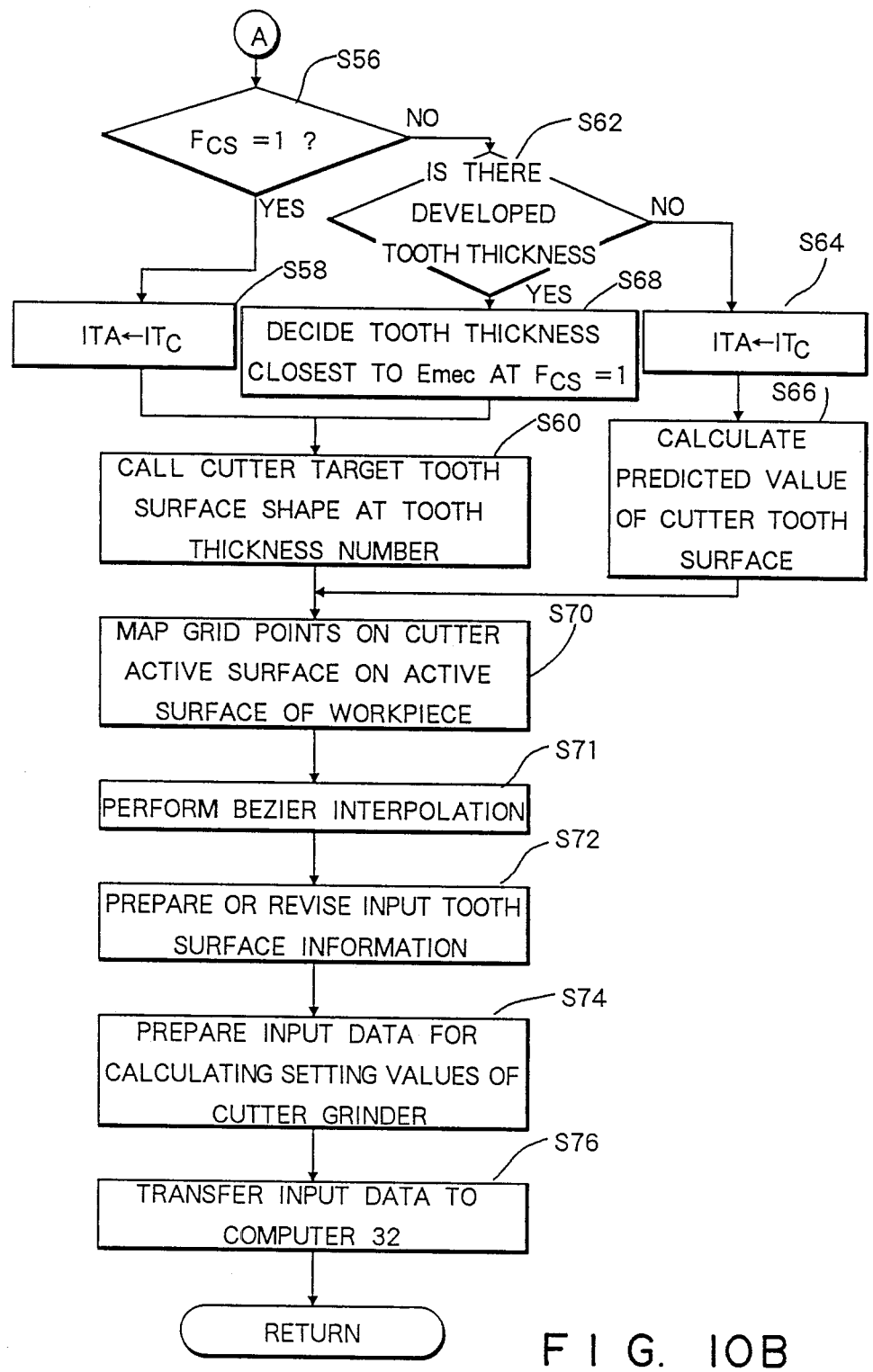
Figure 10C:
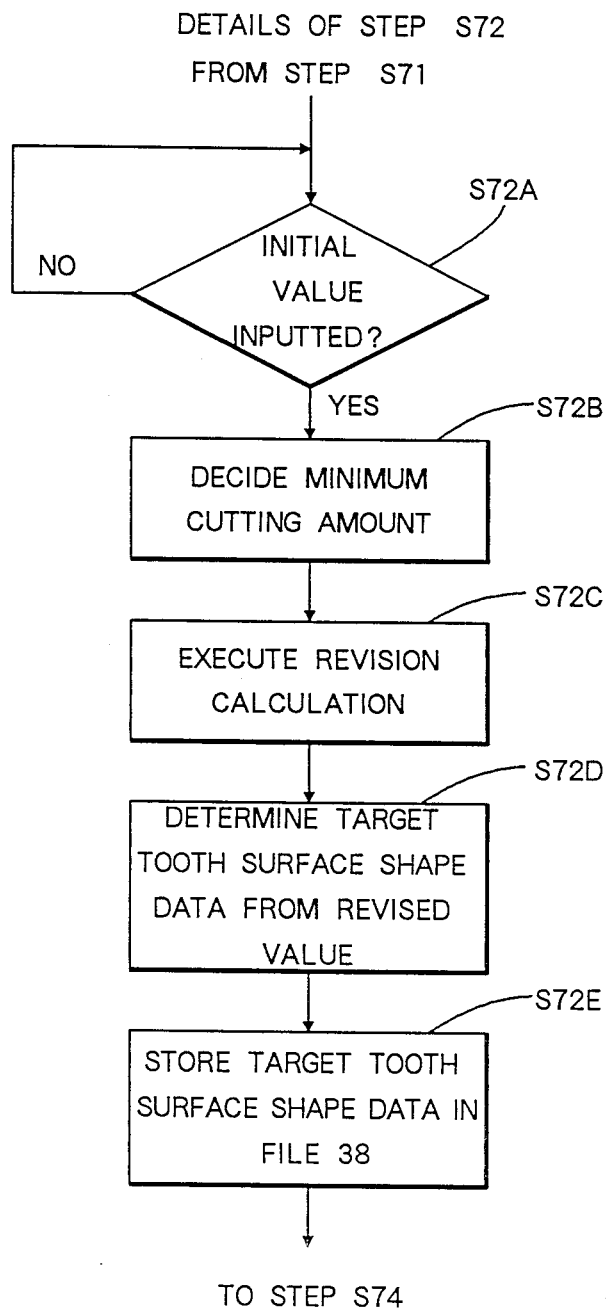
FIG. 10C is a flowchart illustrating the details of a step S72 in the procedure for tooth grinding preparation work.

Reference will now be had to Figs. 10A to 10C to describe the details of the tooth grinding preparation procedure explained briefly hereinabove in connection with step S12.

In this procedure, the target tooth surface shape of the shaving cutter 12 is read out in advance or is decided by computation.

More specifically, the first step of the tooth grinding preparation procedure is a step S44, at which an operation number (e.g. a number indicating that tooth grinding has been completed, is now in progress or is being awaited) is prepared. Next, inputs of the tool number of shaving cutter 12 and the part number of gear workpiece 14 are sensed at a step S46. The program proceeds to the next step (step S48) in response to sensing of these inputs.

Whether a present value $E_{MCA}$ of tooth thickness has been inputted is detected at the step S48. This value indicates the present tooth surface state of the shaving cutter 12 and is obtained by a measurement performed by the operator using a tooth thickness micrometer, not shown. The program proceeds to a step S50 in response to detection of this input. This step calls for a tooth thickness number $IT_c$ of a tooth thickness $E_{mct}$ closest to the present value $E_{MCA}$ of tooth thickness in a list of tooth thicknesses $E_m(IT)$.

Next, for subsequent measurement of the tooth surface shape of the gear workpiece 14, the grid points $\xi_{LW}(I), \eta_{LW}(J); \xi_{RW}(I), \eta_{RW}(J)$ and the standard tooth surfaces $C_{RTW}(I,J), C_{LTW}(I,J)$ at each of the grids are called at a step S52. This is followed by a step S54, at which a number of grid points (reference points) $\xi_{RC}(K), \xi_{LC}(K); \eta_{RC}(L), \eta_{LC}(L)$ on the tooth surface of the shaving cutter 12 are calculated. Here $K=1, \ldots M, M+1, M+2; L=1, \ldots N, N+1, N+2$.

Tooth surface shape data (tooth grinding data) conforming to the tooth thickness number $IT_c$ of the tooth thickness $E_{mct}$ judged to be closest to the present tooth thickness $E_{MCA}$ of the shaving cutter 12 are read out of the storage areas $C_{RSC}(I,J), C_{LSC}(I,J)$ from step 56 onward.

First, at the step S56, it is determined whether the value of the developed state flag $F_{CS}$ of tool thickness number $IT_c$ closest to the present tooth thickness $E_{MCA}$ is 1. If a YES answer is received at the step S56, namely if $F_{CS}=1$ holds, meaning that the tooth grinding data have already been set and stored, the tooth thickness number $IT_c$ is stored in a storage area ITA at a step S58. Thereafter, the cutter target tooth surface shapes (tooth grinding data) of the tooth thickness number $IT_c$ are called from the storage areas $C_{RSC}(I,J), C_{LSC}(I,J)$ at a step S60. Test grinding (described below) of the shaving cutter 12 is carried out based on these tooth grinding data.

If a NO answer is received at the step S56, namely if the developed state flag $F_{CS}$ is 0, meaning that the tooth grinding data have not yet been set and stored, or in other words, that this is the first tooth grinding cycle, a step S62 is executed to set and store the data for every tooth thickness. That is, it is determined at the step S62 whether there is a tooth thickness in the tooth thickness list for which the developed state $F_{CS}$ is 1. If the answer is NO, namely if $F_{CS}=0$ holds for all tooth thickness numbers, the tool thickness number $IT_c$ closest to the present tooth thickness is stored in the storage area ITA at a step S64. Thereafter, the target tooth surface shape data (predicted value) of the shaving cutter 12 for this tooth thickness is calculated at a step S66 using the angle of intersection $\phi$ between the generating lines and the actual lengths $W_C, W_T$ of the lines of action.

Thus, as set forth above, when a cutter target tooth surface shape is calculated for a predetermined tooth thickness number and a subsequent correction (described below) is performed, the developed state value $F_{CS}$ becomes 1. Thus, if target tooth surface shape data for a different tooth thickness are created, using the cutter target tooth surface shape data (grinding data) of the thickness number for which $F_{CS}=1$ holds is generally better in terms of precision than using a calculated value (predicted value) for this thooth thickness. Therefore, if a YES answer is received at the step S62, namely if there is some tool thickness for which $F_{CS}=1$ holds, the program proceeds to a step S68.

A tooth thickness $E_m(ITA)$ for which $F_{CS}=1$ holds and which is closest to the tooth thickness $E_{mct}$ selected in the tooth thickness list is decided at the step S68. Thereafter, the program proceeds to the step S60, at which the cutter target tooth surface shape data (tooth grinding data) of the tool number $IT_c$ for this tooth thickness are called from the storage areas $C_{RSC}(I,J), C_{LSC}(I,J)$ and test grinding of the shaving cutter 12 is carried out based on the tooth grinding data.

Before test grinding is performed, the program proceeds from the step S60 to a step S70 to obtain the tooth grinding data on the active surface of the shaving cutter 12 upon considering the tooth grinding data of the shaving cutter 12 defined on the tooth surface of the gea workpiece 14. The grid points $\xi_{LC}(K), \eta_{LC}(L); \xi_{RC}(K), \eta_{RC}(L)$ on the left and right active surfaces of the shaving cutter 12 are mpped respectively on the left and right active surfaces of the gear workpiece 14 at the step S70. Next, at a step 71, target tooth surfaces $C_{RTV}(K,L), C_{LTV}(K,L)$ (where $K=1, \ldots K, K+1, K+2; L=1, \ldots N, N+1, N+2$) on the active surface of the shaving cutter 12 are decided by Bezier interpolation.

Next, tooth surface information inputted to the cutter grinding control computer 32, namely target tooth surface data $C_{RIV}(K,L), C_{LIV}(K,L)$ at the grid points $\xi_{LC}(K), \eta_{LC}(L); \xi_{RC}(K), \eta_{RC}(L)$ are created at a step S72. Initially, $C_{RIV}(K,L)$ is set to $C_{RTV}(K,L)$ and $C_{LIV}(K,L)$ is set to $C_{LTV}(K,L)$.

When the target tooth surface data $C_{RIV}(K,L), C_{LIV}(K,L)$ are prepared at the step S72, it is determined at a step S72A in FIG. 10C whether a plurality of target tooth surface data $C_{RIV}(K,L), C_{LIV}(K,L)$ (initial values) conforming to tooth thickness within the usable limits of the shaving cutter 12 have been inputted. If the initial values have been inputted, the program proceeds to a step S72B, at which a minimum grinding allowance to be necessary to grind the cutter tooth surface defined by the initial values. Thereafter, the program proceeds to a step S72C, at which each initial value is subjected to a corrective operation which anticipates the grinding allowance of the tooth surface surface. Thereafter, the corrected initial values are stipulated as the target tooth surface data $C_{RIV}(K,L), C_{LIV}(K,L)$ at a step S72D. Then, at a step S72E, these target tooth surface data $C_{RIV}(K,L), C_{LIV}(K,L)$ are stored in the file 38. This completes the detailed description of the procedure of step S72.

It should be noted that the procedure for anticipating the grinding allowance when storing the target tooth surface data $C_{RIV}(K,L), C_{LIV}(K,L)$ mentioned above need not be executed in step S72 but can be executed in the aforementioned procedure. For example, when a present value of tooth thickness is inputted at the step S48, rather than stipulating the present value of tooth thickness based on a measured value from a tooth thickness micrometer, it can be stipulated as a present value of tooth thickness upon correcting the measured value to one which anticipates the grinding allowance. The same results can be obtained even in such case.

Thereafter, input data for calculating a setting quantity indicative of e.g. the axial stroke of the grindstone 16a of cutter grinder 16 are created at a step S74. This is followed by a step S76, at which each item of data is transferred to the cutter grinding control computer 32.

Thus ends one cycle of the tooth grinding preparation procedure, which is a subroutine. The program then proceeds to the main routine.

The test grinding procedure mentioned above in connection with the step S14 will now be described with reference to FIG. 11.

Based on the prescribed information preset in the above-described tooth grinding preparation procedure, it is detected at a step S78 whether the cutter grinder 16 has been set so as to be capable of performing grinding. If a YES answer is received, test grinding of the shaving cutter 12 is executed by the cutter grinder 16 at a step S80. In the test grinding operation, the setting is such that only one arbitrary tooth among the plurality of teeth of shaving cutter 12 is ground, as mentioned above.

The step S80 is followed by a step S82, at which it is detected whether test grinding has been completed for both the left and right tooth surfaces of the single tooth. If the answer is YES, the test grinding procedure of this subroutine ends and the program returns to the main routine.

Figure 12:
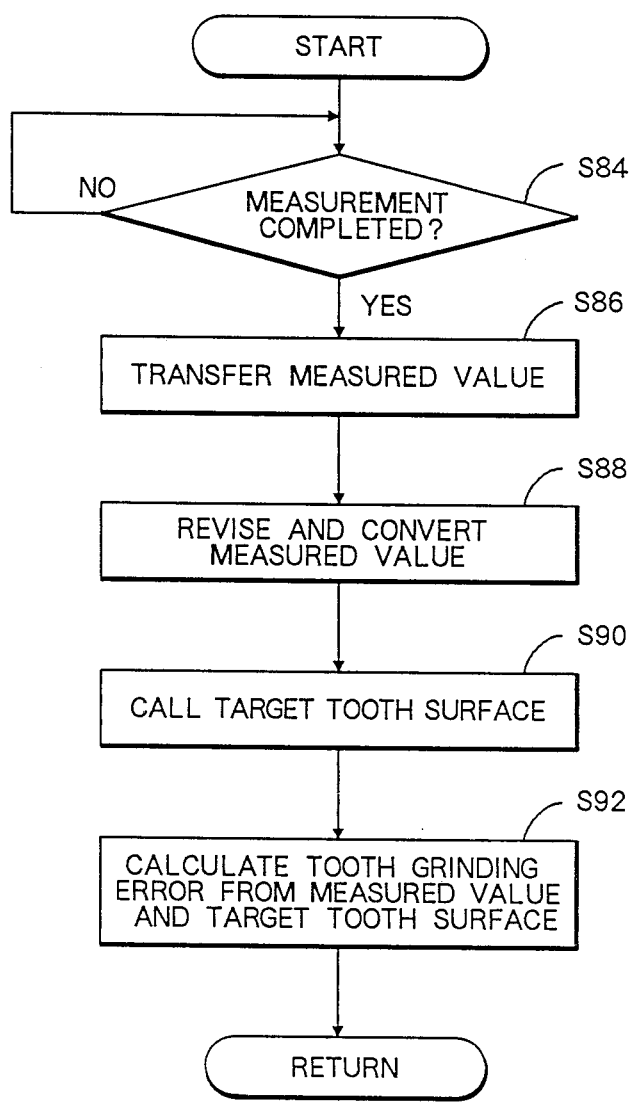
FIG. 12 is a flowchart illustrating a test grinding check procedure.

The test grinding check procedure mentioned above in connection with the step S16 will now be described in detail with reference to FIG. 12.

When the abovementioned test grinding procedure is finished, the tooth surface shape of the test-ground tooth of shaving cutter 12 is measured by the three-dimensional measurement unit 28, and it is determined at a step S84 whether the results of the measurement have been inputted. In the step S84, the tooth surface shape of each tooth of the shaving cutter 12 is measured at a plurality of points in the tooth width direction on the lands $A_2$ . . . while the ranges in which the cerrations $A_1$ are provided are avoided.

Figure 13:
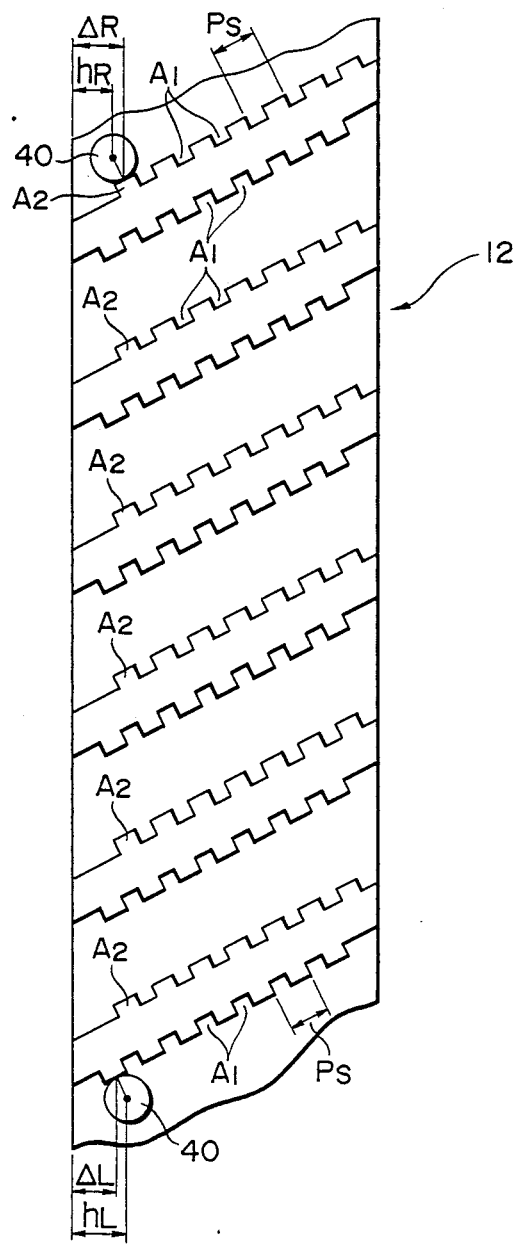
FIG. 13 is a plan view showing the tooth surface state of a shaving cutter developed in a plane.
Figure 17:
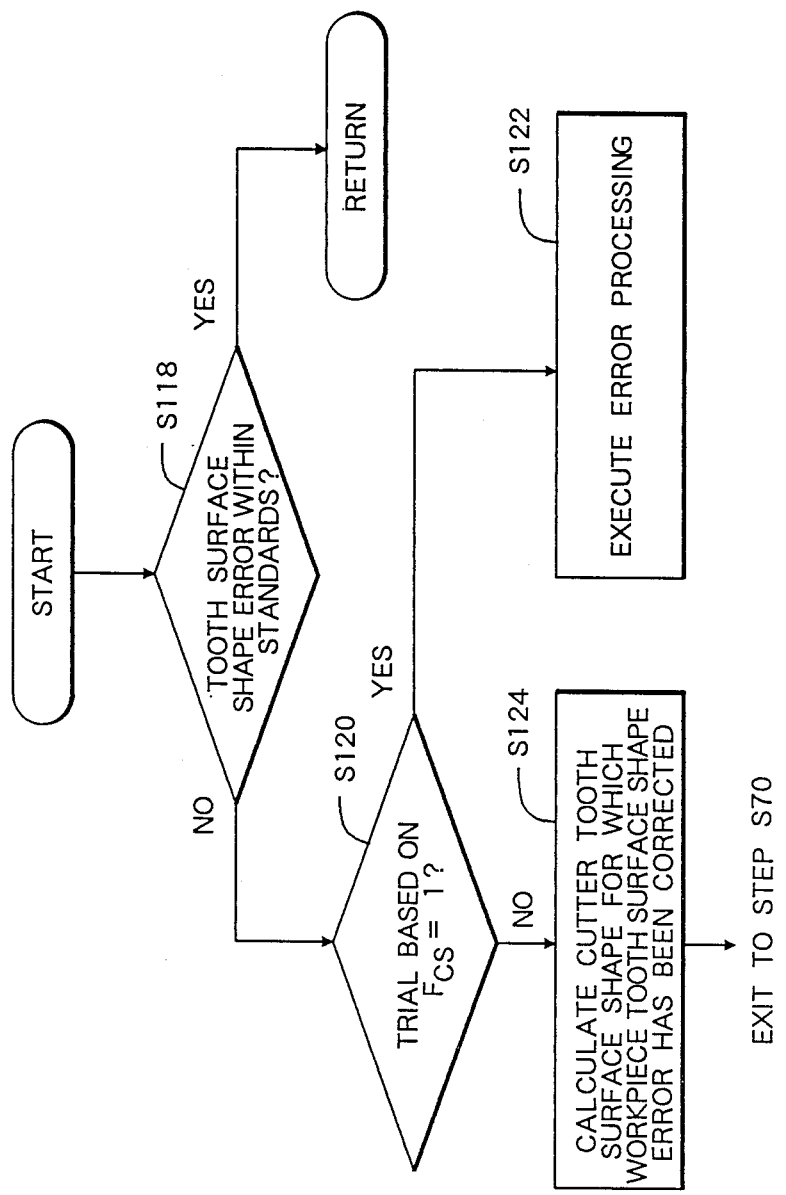
FIG. 17 is a flowchart illustrating a decision procedure for a trial grinding check.

Since the positions in the tooth width direction of the cerrations $A_1$ . . . actually differ for each tooth, the measurement of tooth surface shape is carried out in the following manner: After the position of a reference surface (upper surface) of the shaving cutter 12 has been verified, a probe 40 is manually brought into contact with a position at the approximate center of a land $A_2$ closest to the reference surface on the right tooth surface, as shown in FIG. 13. This position, designated $\Delta R$, is the distance from the reference surface along the Z axis (tooth width direction) and is obtained from the following equation:

$$\Delta_R = h_R + r_p \sin \beta_{gc}$$

where $h_R$ is the distance between the center of the probe and the reference surface, $r_p$ is the radius of the probe, and $\beta_{gc}$ is twist ange on a basic cylinder.

On the other hand, the position $\Delta_L$ of a land $A_2$ closest to the reference surface on the left tooth surface is obtained from the following equation:

$$\Delta_L = h_R - r_p \sin \beta_{gc}$$

Thereafter, the number $N_S$ of cerrations is given and the cerration pitch $P_{SL}$ along the Z axis is calculated based on the following equation:

$$P_{SL} = P_S \cos \beta_{gc}$$

where $P_S$ is the cerration pitch.

Measurement positions in the tooth width direction are decided in order to successively measure the tooth surface shapes of the teeth $A_2$. This is followed by automatically measuring the tooth surface shapes for both the right and left teeth at each measurement position.

The measurement values thus obtained are transferred to the system control computer 36 at a step S86. The program then proceeds to a step S88. Here, upon taking into consideration a shift in each measured value with respect to a set measurement point (grid point), each measured value is corrected, by a spline interpolation, to a value at the grid point (reference point) corresponding to the measured value. Also, the corrected measured values are converted into axial right-angle values $t_{RSC}(K,L)$, $t_{LSC}(K,L)$ (where $K=2, 3 \ldots M$, $M+1$; $L=2, 3 \ldots N, N+1$). Next, at a step S90, the target tooth surfaces (target tooth surface shape values) $C_{RTV}(K,L)$, $C_{LTV}(K,L)$ on the active surface of the shaving cutter 12 and already set at the step S70, and the measured values corrected and converted at the step S88, are read out. This is followed by a step S92, at which the measured values $t_{RSC}(K,L)$, $t_{LSC}(K,L)$ are compared with target tooth surfaces $C_{RTV}(K,L)$, $C_{LTV}(K,L)$ so that tooth grinding errors $E_{RSC}(K,L)$, $E_{LSC}(K,L)$ (where $K=2, 3 \ldots M, M+1$; $L=2, 3 \ldots N$, $N+1$) are calculated from the deviations between these values.

Thus ends the test grinding check procedure, which is a subroutine. The program then proceeds to the main routine.

The details of the check decision procedure of the step S18 mentioned above will now be described with reference to FIG. 14.

The first step of this procedure is S94, at which it is determined whether the tooth grinding errors $E_{RSC}(K,L)$, $E_{LSC}(K,L)$ fall within the standard (allowable limits).

If a NO answer is received at the step S94, namely if the tooth grinding errors $E_{RSC}(K,L)$, $E_{LSC}(K,L)$ do not fall within the standard, then the program proceeds to a step S96, at which modification values of such setting quantities as the differential stroke $F_x$ and helix guide $F\beta_{MX}$ of the cutter grinder 16 are calculated. This is followed by a step S98, at which the input values of the target tooth surfaces $C_{RIV}(K,L)$, $C_{LIV}(K,L)$ (where $K=1, 2 \ldots M, M+1, M+2$; $L=1, 2 \ldots N, N+1, N+2$) at each of the grid points are modified, these value being inputted to the cutter grinding control computer 32. The program then exits to the step S74 of the tooth grinding preparation procedure shown in FIG. 10 in order to regrind the shaving cutter 12.

If a YES answer is received at the step S94, then the all teeth grinding procedure for grinding all of the teeth of shaving cutter 12 is executed at the step S20 of the main routine as already described in connection with FIG. 8. In the all teeth rrinding procedure, the tooth surfaces of each tooth of the shaving cutter 12 are ground in a similar manner by the cutter grinder 16 based on the grinding information for attaining the tooth surface shape judged to be within the allowable limits of the target shape in the check procedure of step S18.

Reference will now be had to FIG. 15 to describe hhe details of the trial shaving procedure of step S22 executed after the all teeth grinding procedure of step S20 in the main routine.

The first step of the trial shaving procedure is S100, at which it is determined whether the shaving cutter 12 all of whose teeth have been trial ground ha been delivered to the gear cutter 26. If a YES answer is received, then the gear workpiece 14 is subjected to trial shaving by the gear cutter 26 in accordance with the usual cutting process at a step S102. Next, it is determined at a step S104 whether shaving of all teeth of the gear workpiece 14 is finished. If the answer is YES, then the tiral shaving procedure of the subroutine ends and the program returns to the main routine.

Next, the trial shaving check procedure briefly described above at the step S24 will be explained with reference to FIG. 16.

When the trial shaving procedure ends, the tooth surface shape of the trial shaved gear workpiece 14 is measured by the operator at the grid points $\xi_{RW}(I)$, $\eta_{RW}(J)$; $\xi_{LW}(I)$, $\eta_{LW}(J)$ already set at the step S52 shown in FIG. 10. In this check procedure, it is determined whether the measured values at these grid points $\xi_{RW}(I)$, $\eta_{RW}(J)$; ), $\xi_{LW}(I)$, $\eta_{LW}(J)$ have been inputted. When input of the measured values is sensed at the step S106, these measured values are converted into the axial right-angle values $t_{RSW}(I,J)$, $t_{LSW}(I,J)$ at a step S108.

Next, the measured values $t_{RSW}(I,J)$, $t_{LSW}(I,J)$ are compared with the corresponding workpiece standard tooth surfaces $C_{RTW}(I,J)$, $C_{LTW}(I,J)$ at a step S110. The shape errors $E_{RSW}(I,J)$, $E_{LSW}(I,J)$ are then calculated at a step S112. This is followed by a step S112, at which the calculated shape errors $E_{RSW}(I,J)$, $E_{LSW}(I,J)$ are revised to tooth surface shape errors of the gear workpiece 14 in a case where the error in the setting quantity of the cutter grinder 16 is corrected in the gear cutter 26.

Thereafter, the revised tooth surface shape errors and the allowed standards are compared at a step S116, thus ending the trial shaving check procedure of the subroutine. The program then returns to the main routine.

Next, the check decision procedure of the step S26 described above will be explained with reference to FIG. 17.

This procedure includes a first step S118, at which it is determined whether the revised tooth surface shape errors, obtained by the comparison in the step S116 of the check control sequence of step S24, fall within the standards. If a NO answer is received at the step S118, namely if the tooth surface shape of the gear workpiece 14 is outside the standards based on the tooth surface shape errors, it is determined at a step S120 whether there is to be a trial based on $F_{CS}=1$. If a YES answer is obtained at the step S120, namely if $F_{CS}=1$, then it is decided that there is an anomaly in the tooth grinding data setting per se. Error processing, such as presenting a display indicating that there is an abnormality, is executed at a step S122.

If a NO answer is received at the step S120, on the other hand, namely if $F_{CS}=0$ holds, the program proceeds to a step S124, at which the selected cutter target tooth surface shape data are corrected and the shaving cutter 12 is reground. More specifically, at the step S124, the cutter target tooth surface shape data in the storage areas $C_{RSC}(I,J)$, $C_{LSC}(I,J)$ are corrected by the tooth surface shape errors $E_{RSW}(I,J)$, $E_{LSW}(I,J)$ of the gear workpiece 14 and an amount of grinding performed per cycle (namely the average grinding allowance for each regrinding bperation). Thereafter, the program exits to the tooth grinding preparation control sequence of FIG. 5 in order to regrind the shaving cutter 12.

If a YES answer is received at the step S118, namely if the tooth surface shape of the gear workpiece 14 is judged to be within the standards based on the tooth surface shape errors, the check decision control sequence of this subroutine is ended and the program returns to the main routine.

Figure 18:
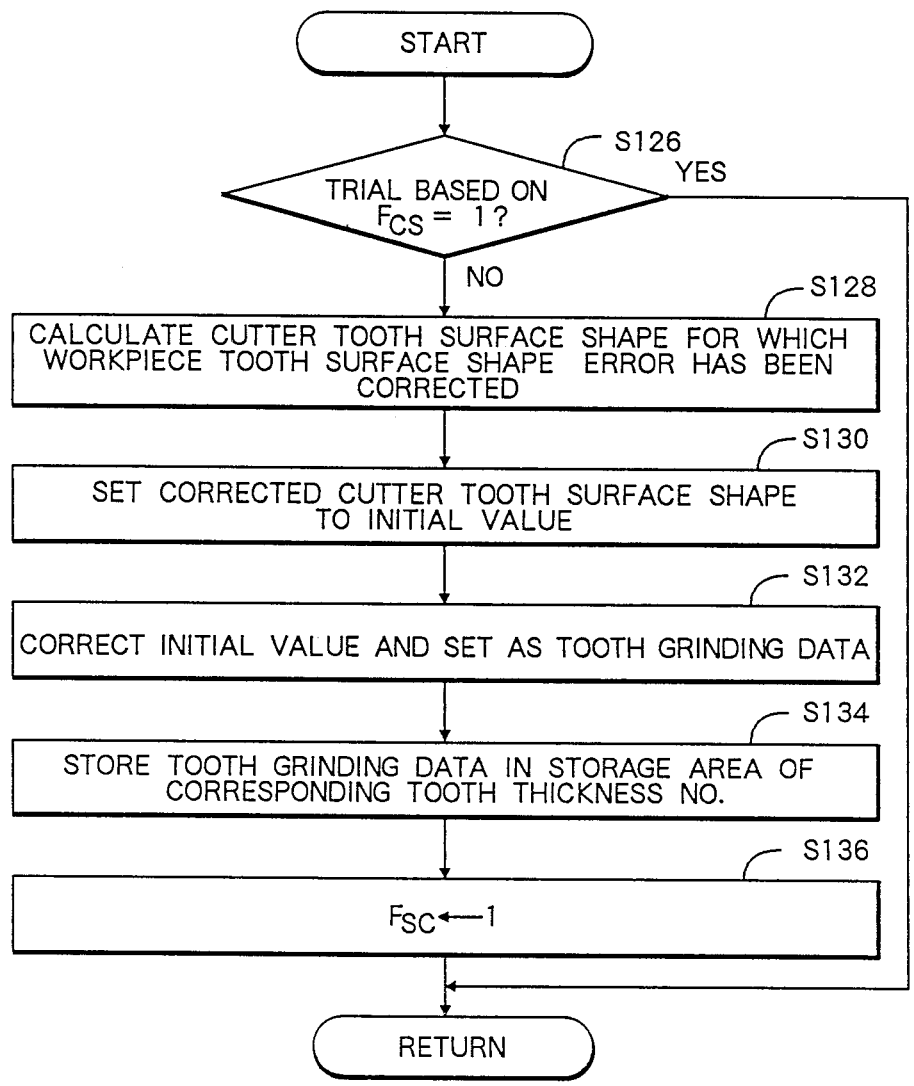
FIG. 18 is a flowchart illustrating a procedure for data update.

The data updating procedure executed in a case where a YES answer is received in the check of step S26 will now be described in detail with reference to FIG. 18.

The first step of the data updating procedure is S126, at which it is determined whether there is to be trial shaving owing to establishment of the condition $F_{CS}=1$. If the answer is NO, namely if $F_{CS}=0$ holds, then the cutter target tooth surface data are revised by the tooth surface shape errors $E_{RSW}(I,J)$, $E_{LSW}(I,J)$ of the gear workpiece 14 at a step S128, just as in the step S124. Next, the revised cutter target tooth surface shape data are set as initial values at a step S130.

This is followed by a step S132, at which the initial values are corrected by having the amount of grinding (the average grinding allowance for every single regrinding operation) per cycle added thereto. Next, these set tooth grinding data are stored in the storage areas $C_{RSC}(I,J)$, $C_{LSC}(I,J)$ of the corresponding tooth thickness number ITA at a step S134. Finally, the developed state flag $F_{CS}$ of tooth thickness number ITA is changed to "1" at a step S136, thereby ending this procedured. The program then returns to the main routine.

On the other hand, if the answer is YES at the step S126, namely if $F_{CS}=1$ holds, then the data updating procedure of the subroutine is not executed and program returns to the main routine.

Figure 8:
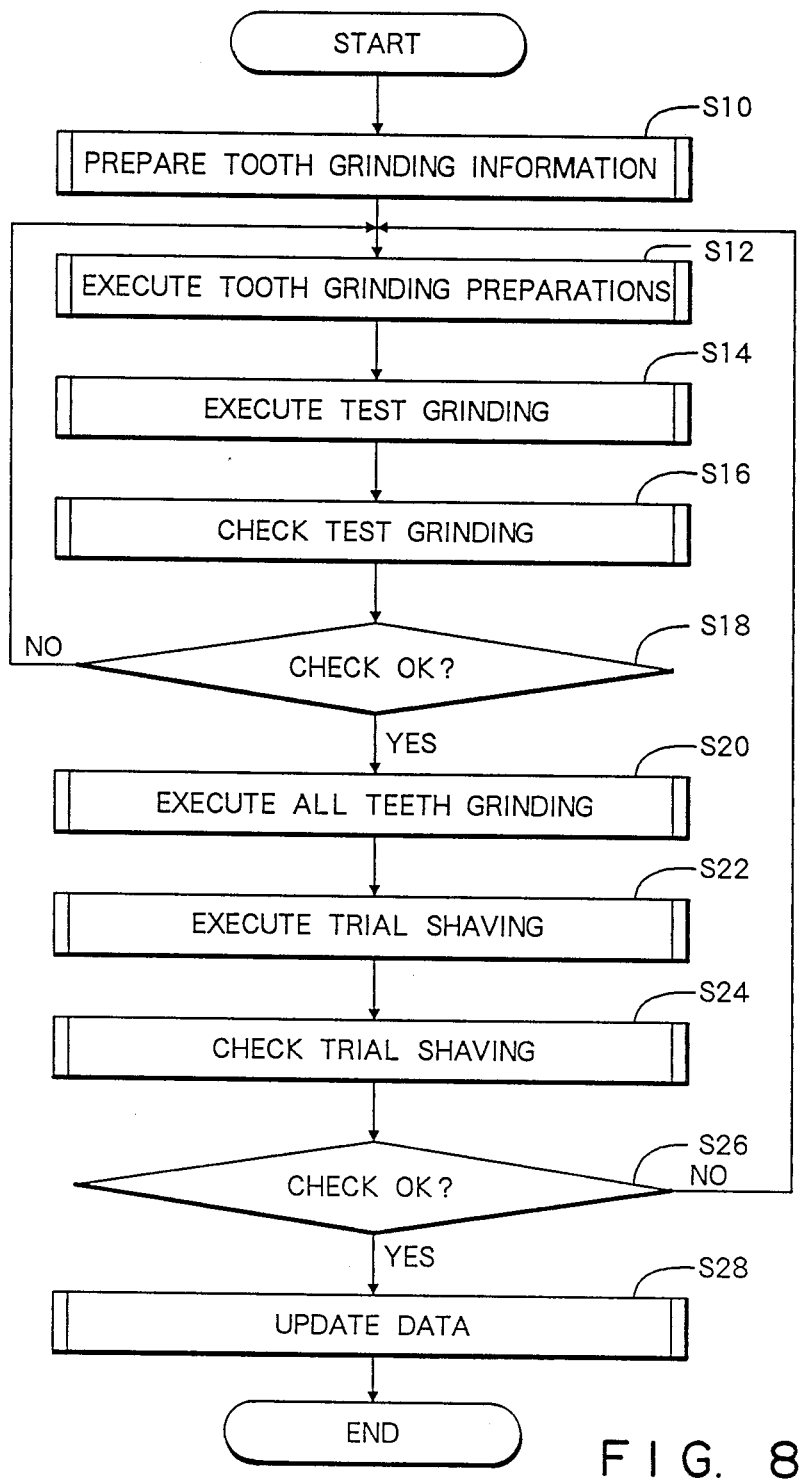
FIG. 8 is a flowchart illustrating the main routine of a tooth grinding prosedure executed by a computer for system control.

Thus, the entire tooth grinding procedure shown in FIG. 8 is completed by the above-described control sequence.

In a case where a number of gear workpieces 14 are cut in the present embodiment, the shaving cutter 12 ground as set forth above is delivered to the gear cutter 26 and the shaving cutter 12 and gear workpiece 14 are meshed with each other and rotated, as shown in FIG. 4, whereby the tooth surfaces of the gear workpiece 14 are cut and shaved to the standard tooth surface shape by the cerrations A1 of the shaving cutter 12.

As this cutting of the gear workpiece 14 proceeds, the tooth surfaces of the shaving cutter 12 experience wear. Whenever a predetermined amount of wear occurs, it is judged that the end of the gear grinding cycle has arrived and regrinding of the tooth surfaces is carried out.

More specifically, in the regrinding operation, the tooth surface state (tooth thickness) of the shaving cutter 12 is measured by a tooth thickness micrometer (not shown), and a processing is executed from step S12 onward of the main routine. By thus performing regrinding every tooth grinding cycle, a single shaving cutter 12 may be reused a plurality of times (e.g. 30) from introduction of the new cutter until the cutter is discarded.

Whenever the shaving cutter 12 is reground, the tooth surface shape thereof after regrinding is measured and it is determined whether tooth surface shape has been formed into the target tooth surface shape. In the measurement of tooth surface shape, the positions of the cerrations $A_1$ differ for every tooth. However, the tooth surface shapes of the lands $A_2$ situated between mutually adjacent cerrations are measured first, with the cerrations $A_1$ being avoided. Then, the measured values are converted into the grid points (reference points) $\xi_{RC}(K)$, $\eta_{RC}(L)$, $\xi_{LC}(K)$, $\eta_{LC}(L)$ on the active surface of the cutter 12. The converted measured values are compared with the target tooth surfaces $C_{RTV}(K,L)$, $C_{LTV}(K,L)$ at the corresponding grid points. If the result of the comparison indicates that the errors are not within allowable limits, regrinding of the tooth surfaces is performed. Thus, the tooth surfaces of the shaving cutter 12 are ground to the target tooth surface shape. Therefore, even if the positions of the cerrations $A_1$ differ for every tooth, the tooth surface shape of each tooth can be accurately and easily ascertained and the tooth surface can be accurately ground into the target tooth surface shape.

When regrinding is performed, the tooth thickness of the shaving cutter 12 becomes smaller with each regrinding operation. As this takes place, there is also a change in the target tooth surface shape of the shaving cutter 12 capable of cutting the gear workpiece 14 into the standard tooth surface shape. However, tooth grinding data in accordance with which the gear workpiece 14 can be cut to the standard tooth surface shape are preset and stored in the storage areas $C_{RSC}(I,J)$, $C_{LSC}(I,J)$ for every previously divided tooth thickness $E_m(IT)$ ($IT = 1, 2 \ldots$).

Thus, before regrinding of the shaving cutter 12, the tooth surface shape (tooth thickness) of the shaving cutter 12 is measured by the three-dimensional measurement unit 28, tool grinding data of the tooth thickness number ITC closest to the measured value are called, and then the tooth surfaces of the shaving cutter 12 are ground based on the called tooth grinding data by means of the grinding control unit 24 using the cutter grinder 16. As a result, the tooth surface of the shaving cutter 12 is ground to the cutter target tooth surface shape corresponding to the tooth grinding data. Accordingly, the reground shaving cutter 12 is moved to the gear cutter 26 and automatically cuts the gear workpiece 14, whereby the gear workpiece 14 is cut to the standard tooth surface shape in excellent fashion.

Moreover, in the present embodiment, the cutter tooth surface shape data (initial values) set and stored in advance for every tooth thickness are corrected by the tooth surface shape errors $E_{RSW}(I,J)$, $E_{LSW}(I,J)$ between the measured values of the tooth surface shape of gear workpiece 14 and the standard tooth surface shapes (target values) thereof at the time trial shaving is carried out. Thus, the precision of the set initial values is kept high so that the tooth surface shape of the gear workpiece 14 is cut to the target shape with excellent precision.

Further, in the present embodiment, each item of tooth grinding data stored in the tooth grinding data memory unit 18 is defined on the tooth surface of the gear workpiece 14. As a result, the tooth grinding data are set independently of the tooth thickness of the shaving cutter 12. This enables the required memory capacity to be reduced correspondingly.

If the tooth grinding data are initially set at a predetermined tooth thickness (e.g. tooth thickness number ITC=3), tooth grinding data for a developed tooth thickness number (e.g. ITC=1) nearest thereto are utilized. In this case, the target tooth surface shape of the shaving cutter 12 is defined on the cutter tooth surface. Therefore, when grid points in a rectangular coordinate system on the cutter tooth surface of each tooth thickness (ITC =1, 2, 3) are mapped on the workpiece tooth surface, the results obtained are as indicated by the broken lines in FIGS. 19 and 20. Specifically, the two maps occupy positions that are slightly different from each other. Consequently, even though the tooth surface shape is given a tooth thickness number ITC=1 in terms of the cutter coordinates, the transference of the map onto the workpiece tooth surface is incorrect by an amount corresponding to the displacement of the rectangular coordinate system grid points.

Figure 19:
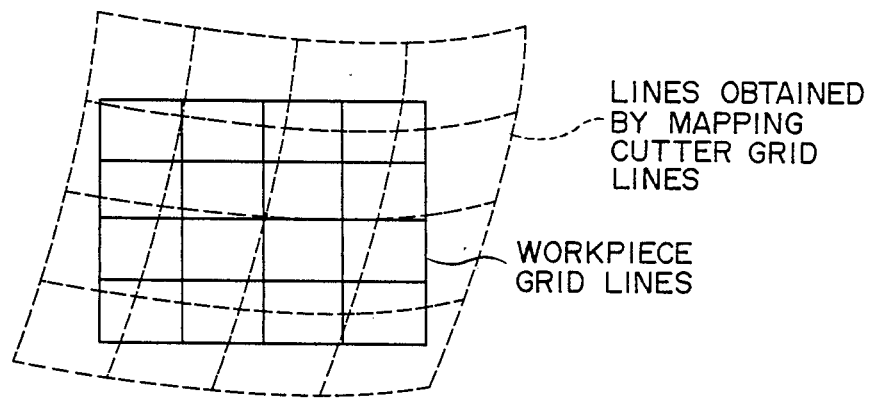
FIGS. 19 and 20 are plan views schematically illustrating positional displacement in a case where grid points on cutter tooth surfaces having different tooth thickness numbers are mapped on a tooth surface of the gear workpiece.
Figure 20:
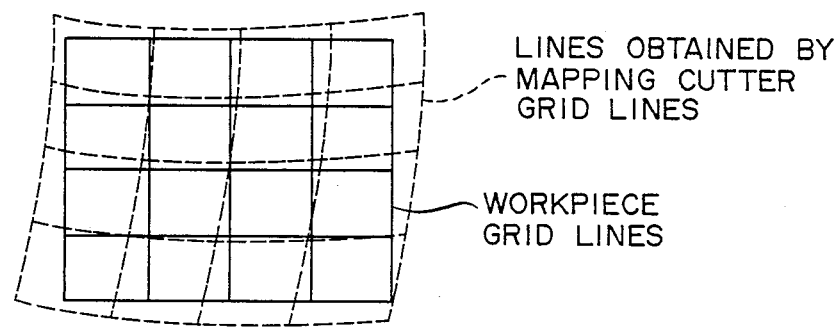

In the present embodiment, however, the target tooth surface shape is defined by the rectangular coordinate system grid points on the tooth surface of the gear workpiece 14, as indicated by the solid lines in FIGS. 19 and 20. As a result, the target tooth surface shape will not change irrespective of each tooth thickness number ITC, and the gear workpiece 14 will be cut to the target tooth surface shape in excellent fashion without occurrence of the abovementioned displacement even if the target tooth surface shape at a tooth thickness number ITC=1 is utilized.

Moreover, in the present embodiment, the tooth grinding data set and stored in advance for every tooth thickness are such that, first, initial values are set, these being the result of a correction by the tooth surface shape errors $E_{RSW}(I,J)$, $E_{LSW}(I,J)$, which are the differences between measured values of the tooth shape surfaces of the gear workpiece 14 at test cutting and the standard tooth surface shapes (target values). Thereafter, the amount of grinding performed by a single grinding operation is added to these prescribed values and the results are stored in memory. Consequently, an error corresponding to the grinding allowance of the grindstone 16a of cutter grinder 16 will not occur even when regrinding is performed. Thus, the tooth surface shape of the gear workpiece 14 is cut to the target shape with excellent precision.

In a case where tooth grinding data are initially set at a predetermined tooth thickness, tooth grinding data for a developed tooth thickness number ITC nearest thereto are utilized. In this connection, if the tooth grinding data utilized are not corrected by the tooth surface shape errors of the gear workpiece 14 as mentioned above, the tooth surface shape errors of the gear workpiece 14 at the tooth thickness thereof contain the tooth surface shape errors of the gear workpiece 14 cut this time in addition to the tooth surface shape errors contained in the utilized tooth grinding data per se. Thus, there is less of a possibility that a measured value will fall within the allowable limits of the standard tooth surface shape. By contrast, in accordance with the present embodiment, when the tooth grinding data are corrected by the tooth surface shape errors of the gear workpiece 14, only the tooth surface shape errors of the gear workpiece 14 cut this time are included. Thus, the cutting failure rate of the gear workpiece 14 is very low and cutting precision is improved. Accordingly, in the present embodiment, when the shaving cutter 12 is reground, the grinding of the tooth surface shape thereof can be performed automatically in simple fashion and in a short period of time without depending upon the operator's impressions and without requiring a high level of operator skill. In addition, the tooth grinding accuracy of the shaving cutter 12 for obtaining the standard tooth surface shape of the gear workpiece 14 is held high irrespective of the tooth surface state (tooth thickness).

In the present embodiment, moreover, the tooth grinding data for each tooth thickness are defined on the tooth surface of the gear workpiece 14. As a result, the required memory capacity can be reduced. The precision of these tooth grinding data can be raised by correcting them, thereby making possible a great improvement in the precision with which the gear workpiece 14 is cut. In addition, by preventing the occurrence of an error due to the grinding allowance of the tooth surface at the cutter grinder 16, the precision with which the gear workpiece 14 is ground is improved even further.

As many apparently widely different embodiments of the present invention can be made without departing from the spirit and scope thereof, it is to be understood that the invention is not limited to the specific embodiments thereof except as defined in the appended claims.

What is claimed is:

1. A shaving cutter tooth grinding method for repeatedly grinding a plurality of times, by a cutter grinder, a tooth surface of a shaving cutter which cuts gear workpieces, the grinding being performed whenever the tooth surface of the shaving cutter sustains wear, said method comprising:
   a first step of setting a plurality of tooth surface states in dependence upon a tooth grinding cycle within a usable range of the shaving cutter;
   a second step of setting a plurality of tooth grinding data in such a manner that a gear workpiece can be cut to a target tooth surface shape according to each tooth surface state set in said first step;
   a third step of storing the plurality of tooth grinding data set in said second step in memory means;
   a fourth step of measuring a tooth surface state of the shaving cutter;
   a fifth step of selecting a tooth surface state, which is close to the tooth surface state measured in said third step, from the plurality of tooth surface states set in said first step;
   a sixth step of calling tooth grinding data, which conform to the tooth surface information selected in said third step, from the plurality of tooth grinding data stored in the memory means; and
   a seventh step of controlling the cutter grinder in such a manner that the tooth surface of the shaving cutter is ground based on the tooth grinding data called in said sixth step.

2. The method according to claim 1, wherein said second step includes:
   a first subordinate step of deciding in advance a plurality of initial values, which conform to the tooth surface states, in the usable range of the shaving cutter;
   a second subordinate step of revising the initial values decided in said first subordinate step in anticipation of an amount of grinding of the tooth surface; and
   a third subordinate step of setting the initial values, which have been revised in said second subordinate step, as tooth grinding data.

3. The method according to claim 1, wherein said seventh step includes:
   a trial grinding subordinate step of grinding teeth of the shaving cutter based on said tooth grinding data;
   a measurement subordinate step of measuring tooth surface shape ground in said trial grinding subordinate step;
   a comparison subordinate step of comparing the tooth surface shape measured in said measurement step and a target tooth surface shape; and
   a feedback subordinate step of setting the gear workpiece so as to be cut by the ground shaving cutter if a deviation between the measured tooth surface shape and the target tooth surface shape in said comparison subordinate step is within set allowable limits, and executing said trial grinding subordinate step upon changing the tooth grinding data if the deviation between the measured tooth surface shape and the target tooth surface shape in said comparison subordinate step is outside the set allowable limits.

4. The method according to claim 3, wherein said trial grinding subordinate step includes:
   a test grinding process for grinding only one tooth of the shaving cutter baeed on said tooth grinding data;
   a measurement process of measuring the tooth surface shape of the tooth ground in said test grinding process;
   a comparison process of comparing the tooth surface shape measured in said measurement process and the target tooth surface shape;
   an all-tooth grinding process, wnich is executed when the deviation between the measured tooth surface shape and the target tooth surface shape in said comparison process is within the set allowable limits, of grinding all teeth of the shaving cutter; and
   a feedback process of executing said test grinding process upon changing the tooth grinding data when the deviation between the measured tooth surface shape and the target tooth surface shape in said comparison process is outside the set allowable limits.

5. The method according to claim 4, wherein the tooth surface measured in said measurement process is prescribed as a measured value in said measurement subordinate step when the deviation is within the set allowable limits in said comparison process.

6. The method according to claim 3, wherein said feedback subordinate step includes:
   a revision process of revising said called tooth grinding data based on the deviation when said deviation is within the set allowable limits, and
   a storage process of storing the tooth grinding data revised in said revision process.

7. The method according to claim 6, wherein said revision process substitutes and revises a measured tooth surface shape within allowable limits as tooth grinding data.

8. The method according to claim 1, wherein the tooth surface of said shaving cutter is composed of a number of cerrations which differ from one tooth to another in the tooth width direction, and a land defined between mutually adjacent ones of said cerrations, and said fourth step includes:
   a first subordinate step of storing in advance a plurality of reference points on the tooth surface of the shaving cutter;
   a second subordinate step of measuring the tooth surface of the ground shaving cutter on said land at a plurality of points in the tooth width direction; and a third subordinate step of converting measured values obtained in said second subordinate step into values at said reference points, the measured values obtained by the conversion in said third subordinate step being prescribed as measured values in said fourth step.

9. A shaving cutter tooth grinding method for repeatedly regrinding a plurality of times, by a cutter grinder, a tooth surface of a shaving cutter which cuts gear workpieces, the grinding being performed whenever the tooth surface of the shaving cutter sustains wear, said method comprising:

a first step of storing a plurality of tooth grinding data preset in such a manner that a gear workpiece can be cut to a target tooth surface shape, according to each of a plurality of tooth surface shape states, within a usable range of the shaving cutter;

a second step of measuring a tooth surface state of the shaving cutter;

a third step of selecting a tooth surface state, which is close to the tooth surface state measured in said third step, from the plurality of tooth surface states set in said first step;

a fourth step of calling tooth grinding data, which conform to the tooth surface information selected in said third step, from the plurality of tooth grinding data stored in the memory means; and a fifth step of controlling the cutter grinder in such a manner that the tooth surface of the shaving cutter is ground based on the tooth grinding data called in said fourth step.

* * * * *